United States Patent [19]
Dye et al.

[11] Patent Number: 5,492,879
[45] Date of Patent: Feb. 20, 1996

[54] CATALYST COMPRISING FINELY DIVIDED METALS AND OXIDIZED METALS

[75] Inventors: James L. Dye, East Lansing; Ahmed S. Ellaboudy, Midland; Kuo-Lih Tsai, East Lansing, all of Mich.

[73] Assignee: Board of Trustees operating Michigan State University, East Lansing, Mich.

[21] Appl. No.: 225,081

[22] Filed: Apr. 8, 1994

Related U.S. Application Data

[60] Continuation of Ser. No. 950,290, Sep. 24, 1992, abandoned, which is a division of Ser. No. 522,661, May 1, 1990.

[51] Int. Cl.$^6$ .............................. B01J 23/42; B01J 23/52
[52] U.S. Cl. ............................................ 502/326; 502/344
[58] Field of Search .................................. 502/104, 344, 502/339, 326, 350

[56] References Cited

U.S. PATENT DOCUMENTS

| | | |
|---|---|---|
| 4,107,180 | 8/1978 | Dye . |
| 5,032,565 | 7/1991 | Berrebi ................................. 502/344 |

OTHER PUBLICATIONS

Rieke, R., Science 246, 1260–1264 (1989).
H. Hirai et al., J. Macromol. Sci–Chem., A12, 1117 (1978); A13, 727 (1979); H. Hirai, ibid, A13, 633 (1979).
T. W. Smith & D. Wychick, J. Phys. Chem., 84, 1621 (1980).
M. Kilner et al, J. Chem. Soc. Chem. Comm., 356 (1987).
K. Kimura & S. Bandow, Bull. Chem. Soc. Jpn. 56, 3578 (1983).
K. Kimura, ibid, 57, 1683 (1984); 60 3093 (1987).
R. D. Rieke et al., J. Am. Chem. Soc., 96, 1775 (1974).
J. Org. Chem., 40 2253 (1975); ibid 44, 3069 (1979); ibid 46, 4323 (1981).
J. Am. Chem. Soc. 96 608–609 (1974).
J. Physical Chem. 79, 3065–3070 (1975).
Angew. Chem. Int. Ed. Engl. 18, 587–598 (1979).
Alkali Metals McGraw–Hill Yearbook of Science & Tech. 87–89 (1981).
Inorganic Chem., 21, 1966–1970 (1982).
J. Am. Chem. Soc. 105, 6490–6491 (1983).
Chemistry in Britain 20, 210–215 (1984).
Progress in Inorganic Chemistry, John Wiley & Sons 32, 327–441 (1984).
J. Physical Chem. 88, 3852–3855 (1984).
J. Am. Chem. Soc. 108, 3534–3535 (1986).
J. Am. Chem. Soc. 109, 5561–5563 (1987).
J. Am. Chem. Soc. 101, 7203–7204 (1987).
Valency & Charge Dist., In Alkalide & Electride Salts, Proc. Robt. Welch Found. Conf. on Chem. Res. XXXII Valency, pp. 65–91 (1988).
Nature 331, 599–601 (1988).
J. Coord. Chem. 18, 121–128 (1988).
J. Am. Chem. Soc. 111, 935–938 (1989).
J. Am. Chem. Soc. 111, 5957–5958 (1989).
Pure & Appl. Chem. 61, 1555–1562 (1989).
Ann. Rev. Phys. Chem. 38, 271–301 (1987).

*Primary Examiner*—Melvyn Andrews
*Attorney, Agent, or Firm*—Ian C. McLeod

[57] ABSTRACT

A process for producing finely divided 20 to 500 angstrom metal particles, metals with oxide coatings or metal oxides using an alkalide or electride in a non-reactive solvent is described. The process produces various forms of the metal depending upon the oxidizability of the metal initially produced by the process. The process is useful for producing catalysts, alloys, colloidal solutions, semi-conductors and the like.

6 Claims, 37 Drawing Sheets

5,492,879

CATALYST COMPRISING FINELY DIVIDED METALS AND OXIDIZED METALS

This is a continuation of application(s) Ser. No. 07/950,290 filed on Sep. 24, 1992, now abandoned, which is a division of Ser. No. 07/522,661, filed May 11, 1990.

BACKGROUND OF THE INVENTION (1) Field of the Invention

The present invention relates to a process and compositions including a finely divided metal, metal oxide coated metal, metal oxide and other oxidized metal produced by the use of alkalides and electrides to reduce a soluble metal salt in an organic solvent. In particular, the present invention relates to a process which produces the finely divided metal, metal oxide coated metal or metal oxide or other oxidized metal depending upon the oxidizability of a metal initially produced by the process.

(2) Prior Art

Homogeneous reduction of noble metal salts by mild reducing agents, even in aqueous solution is well known. Solid alkali metals and suspensions of alkali metals are also often used as reductants. The use of homogeneous strong reducing agents in aprotic solvents to produce finely divided metals has been limited to reduction by aromatic radical anions and/or aromatic dianions such as sodium naphthalenide (Rieke, R., *Science* 246, 1260–1264 (1989)). Often the reductions are slow and must be done at the reflux temperatures of THF. The most common source of solvated electrons is found in metal-ammonia and metal-amine solutions. Indeed, these solutions are commonly used in industry and research to reduce organic compounds (Birch reductions). The problem encountered with transition metal reductions by metal-ammonia solutions is the formation of metal amides and imides by deprotonation of the solvent. Complex mixtures result from such reactions and one seldom gets the transition metal itself.

Examples of metal particle production are:

1. Mild reduction of noble metals in the presence of soluble polymers to yield 10–50 Å particles. H. Hirai, Y. Nakao and N. Toshima, *J. Macromol. Sci-Chem.*, A12, 1117 (1978); A13, 727 (1979); H. Hirai, ibid, A13, 633 (1979).

2. Zero-valent compounds such as $Fe(CO)_5$ can be thermally decomposed in polymers to yield colloidal dispersions of metal. T. W. Smith and D. Wychick, *J. Phys. Chem.*, 84, 1621 (1980).

3. Metal vapor deposition in a solvent matrix can give small metal particles, M. Kilner, N. Mason, D. B. Lambrick, P. D. Hooker and P. L. Timms, *J. Chem. Soc. Chem. Comm.*, 356 (1987). K. Kimura and S. Bandow, *Bull. Chem. Soc. Jpn*, 56, 3578 (1983); K. Kimura, ibid, 57, 1683 (1984); 60 3093 (1987).

4. Heterogeneous reduction by alkali metals in ethers with or without an aromatic compound present as an electron carrier has been used to prepare metals. R. D. Rieke et al., *J. Am. Chem. Soc.*, 96, 1775 (1974); *J. Org. Chem.*, 40 2253 (1975); ibid 44, 3069 (1979); ibid, 46, 4323 (1981).

Research with alkalides and electrides as described in:

(1) U.S. Pat. No. 4,107,180 to Dye;

(2) *J. Am. Chem. Soc.* 96, 608–609 (1974);

(3) *J. Physical Chem.* 79, 3065–3070 (1975);

(4) *Angew. Chem. Int. Ed. Engl.* 18, 587–598 (1979);

(5) *Alkali Metals McGraw-Hill Yearbook of Science and Technology* 87–89 (1981);

(6) *Inorganic Chem.*, 21, 1966–1970 (1982);

(7) *J. Am. Chem. Soc.* 105, 6490–6491 (1983);

(8) *Chemistry in Britain* 20 210–215 (1984);

(9) *Progress in Inorganic Chemistry*, John Wiley & Sons 32, 327–441 (1984);

(10) *J. Physical Chem.* 88, 3852–3855 (1984);

(11) *J. Am. Chem. Soc.* 108, 3534–3535 (1986);

(12) *J. Am. Chem. Soc.* 109, 5561–5563 (1987);

(13) *J. Am. Chem. Soc.* 101, 7203–7204 (1987);

(14) *Valency and Charge Distribution, In Alkalide and Electride Salts*, Proceedings of The Robert A. Welch Foundation Conference on Chemical Research XXXII Valency, pg 65–91 (1988);

(15) *Nature* 331, 599–601 (1988);

(16) *J. Coord Chem.* 18, 121–128 (1988);

(17) *J. Am. Chem. Soc.* 111, 935–938 (1989);

(18) *J. Am. Chem. Soc.* 111, 5957–5958 (1989);

(19) *Pure & Appl. Chem.* 61, 1555–1562 (1989); and

Ann. Rev. Phys. Chem. 38, 271–301 (1987); showed that relatively concentrated solutions (>0.1 M in many cases) are obtained which contain $e_s^-$ and/or $M^-$ in aprotic solvents such as dimethyl ether. This research provided the possibility to carry out reductions in the absence of proton sources other than the highly non-acidic —$CH_2$— and —$CH_3$ protons of the solvent and complexant; however, the means for accomplishing such a reaction was not known.

OBJECTS

It is therefore an object of the present invention to provide a process for the preparation of a metal, metal with an oxide coating, metal oxide or other oxidized metal depending upon the handling of the reaction product and the oxidizability of the metal. Further it is an object of the present invention to provide a process which allows the reaction to proceed with an alkalide or electride. These and other objects will become increasingly apparent by reference to the following description and the drawings.

IN THE DRAWINGS

Figure 27A:
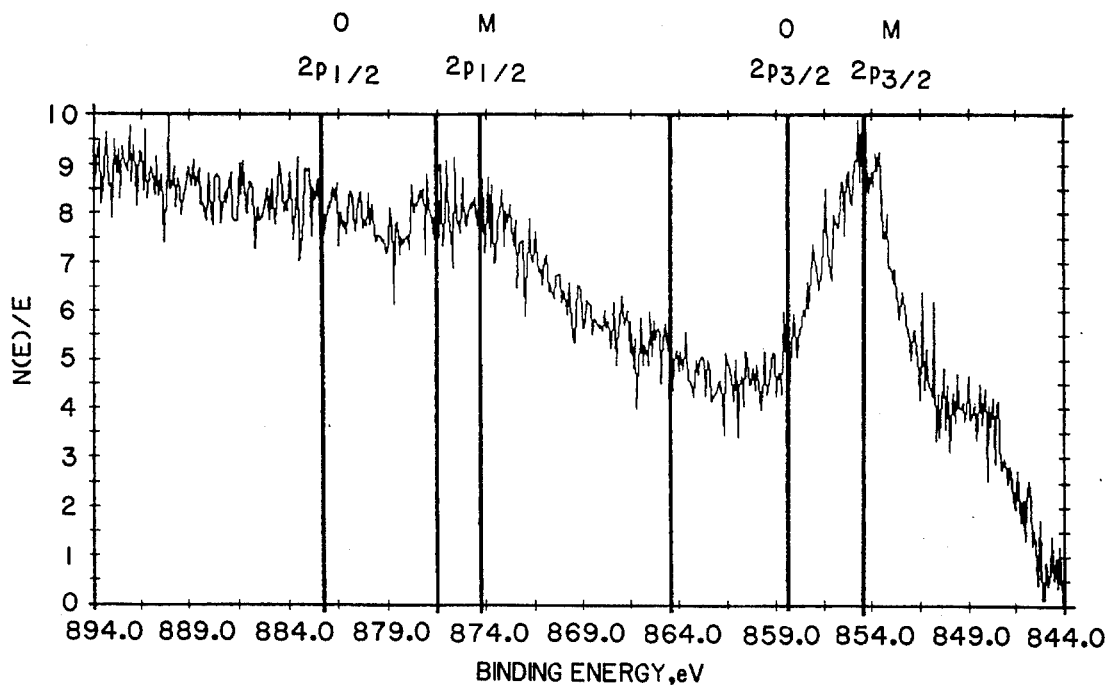
Figure 27B:
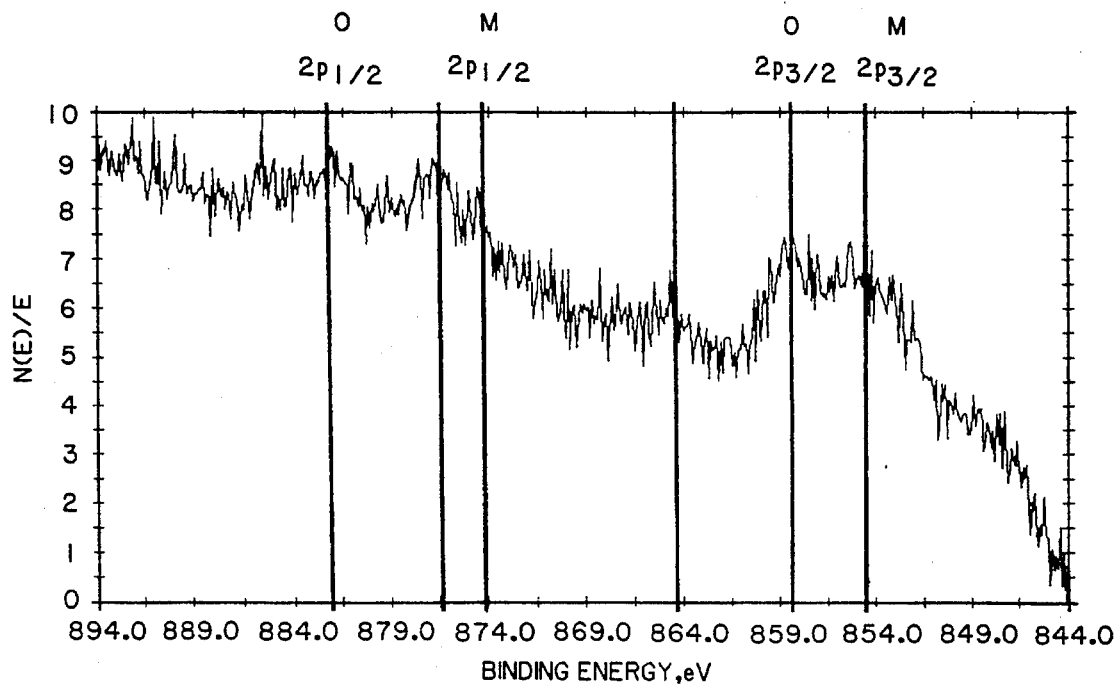
Figure 27C:
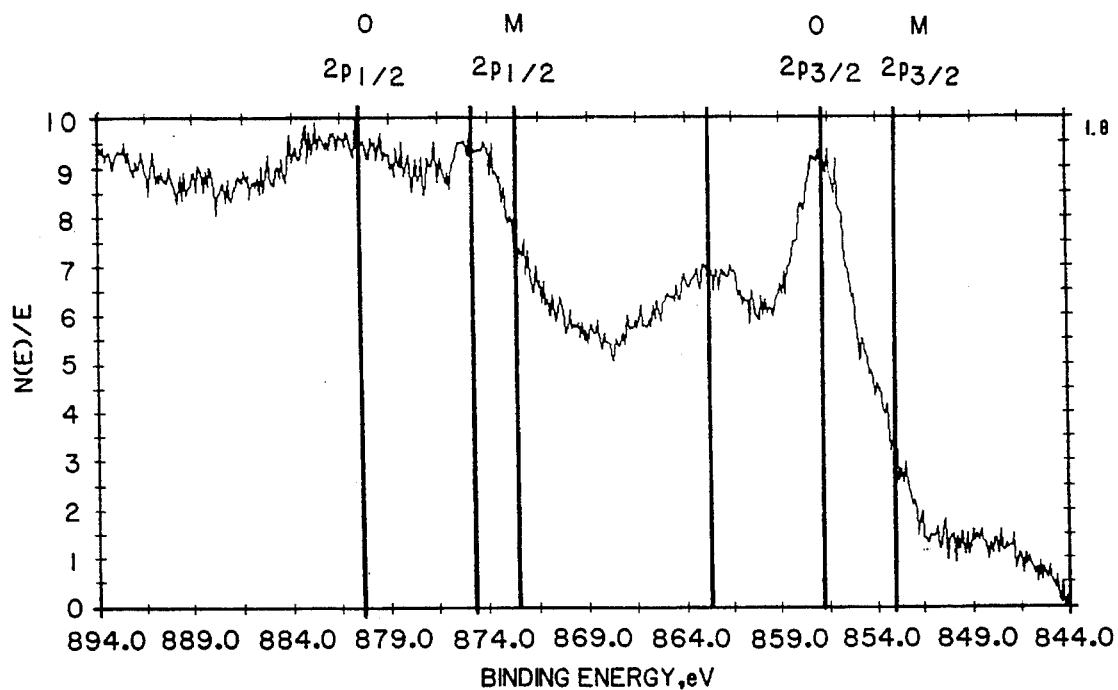

FIGS. 27A, 27B, and 27C are graphs showing the XPS spectra of a Ni product before air oxidation (FIG. 27A) after being oxidized in air (FIG. 27B) and after washing with methanol (FIG. 27C).

Figure 28A:
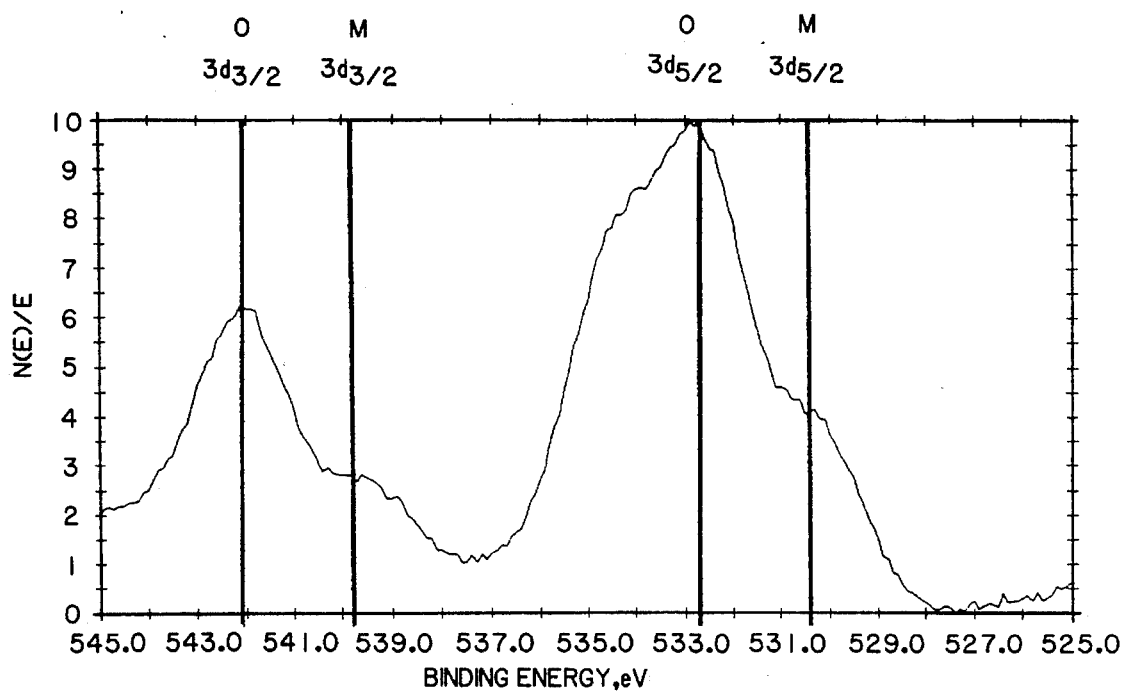
Figure 28B:
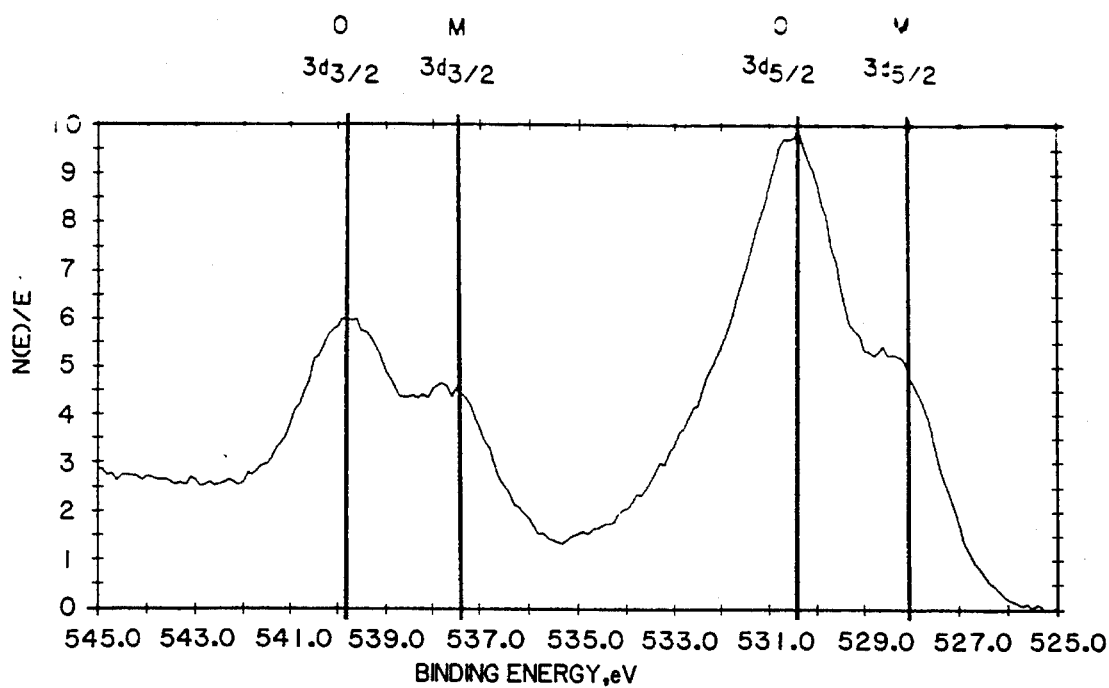
Figure 28C:
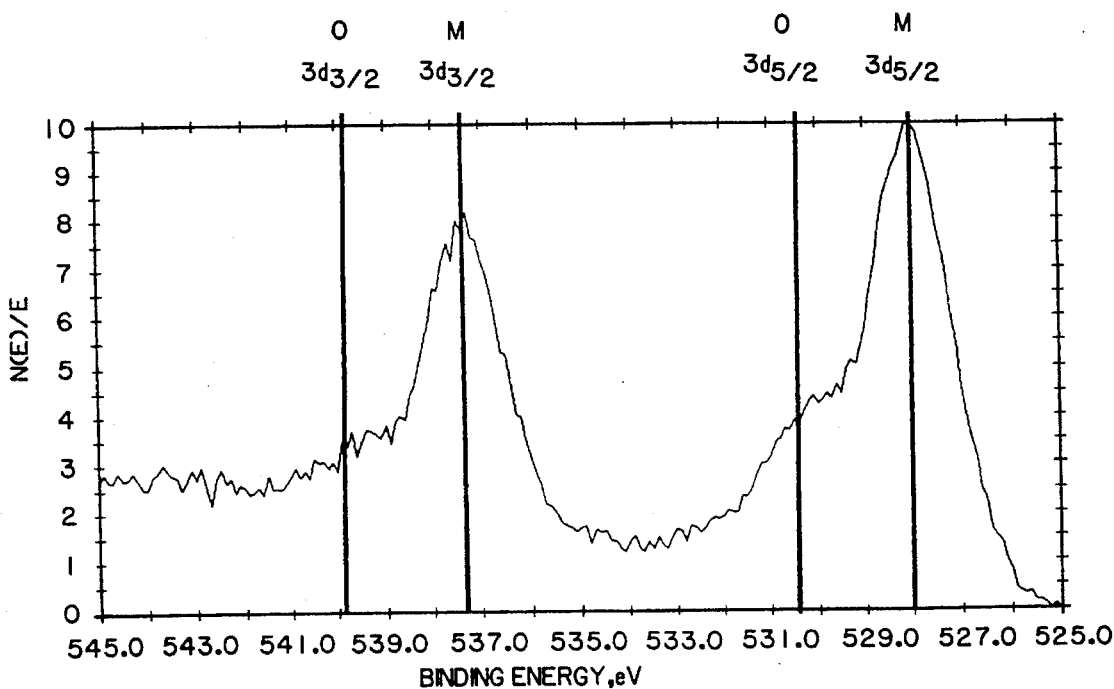

FIGS. 28A, 28B and 28C are graphs showing the XPS spectra of a Sb product before washing (FIG. 28A), after washing with methanol (FIG. 28B) and after sputtering in argon gas (FIG. 28C).

Figure 29A:
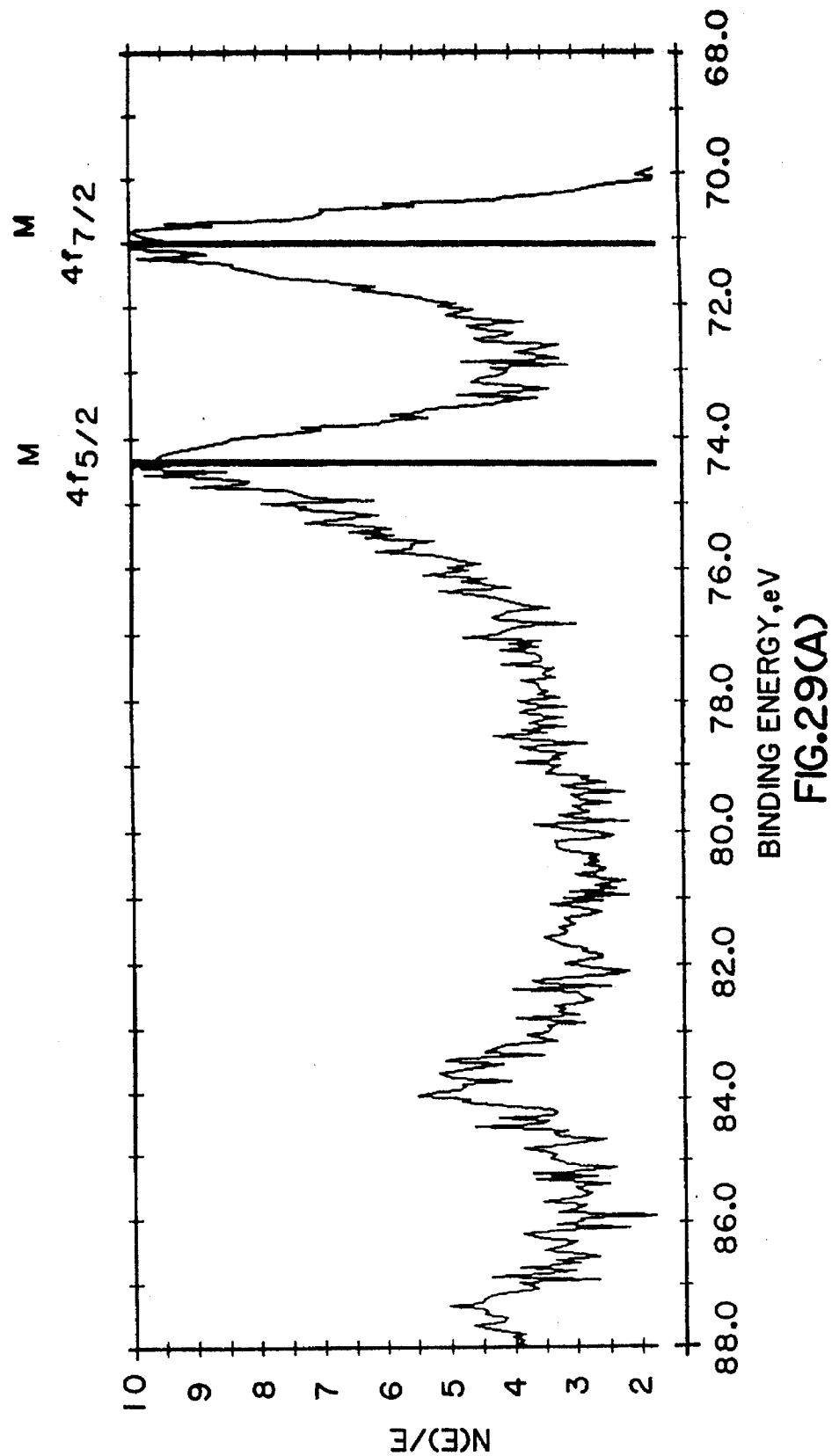
Figure 29B:
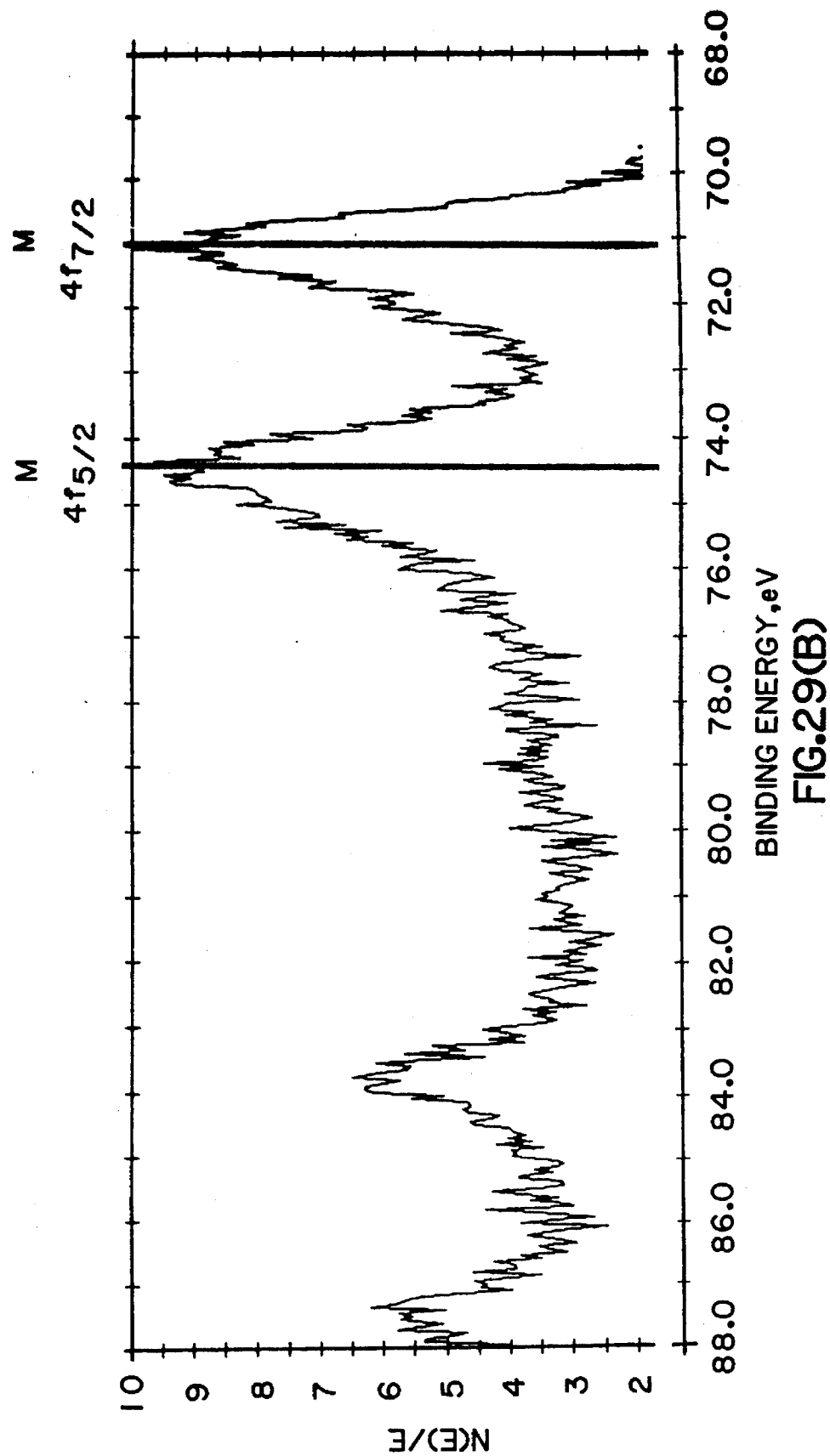
Figure 29C:
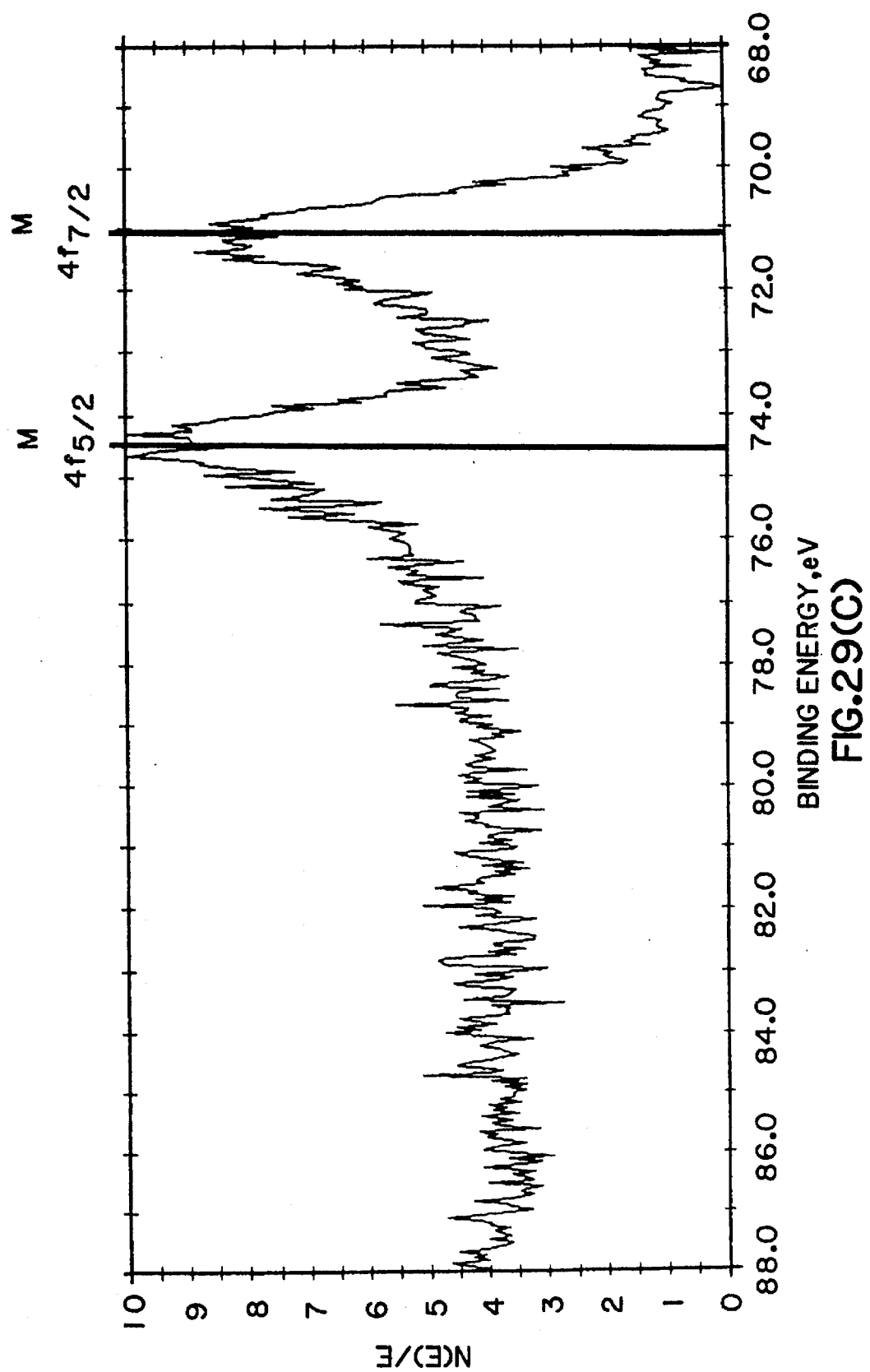

FIGS. 29A, 29B and 29C are graphs showing the XPS spectra of the Pt product after washing with methanol before exposure to air (FIG. 29A) after a brief exposure (16 min) to air (FIG. 29B) and after exposure to air for days (FIG. 29C). The two peaks at the left in FIGS. 28A and 28B are from the gold-coated cover.

Figure 30:
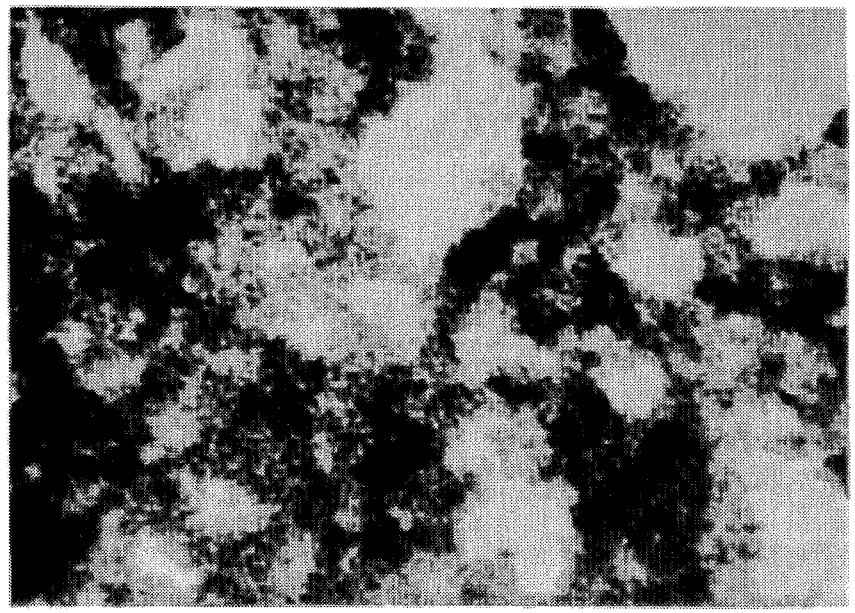

FIG. 30 is an electron micrograph of Pt particles at 320,000 times magnification (310Å/cm).

Figure 31:
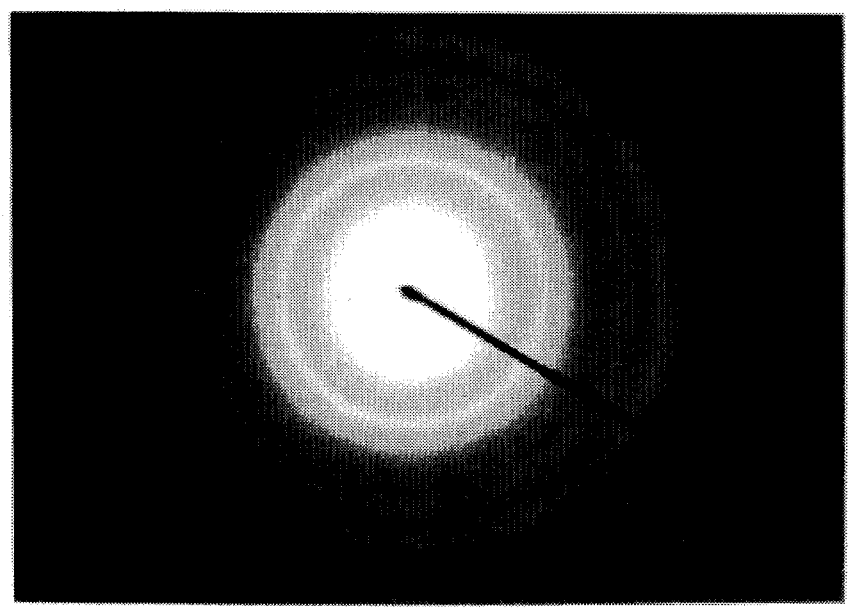

FIG. 31 is a photograph of an electron diffraction pattern of Pt particles.

Figure 32:
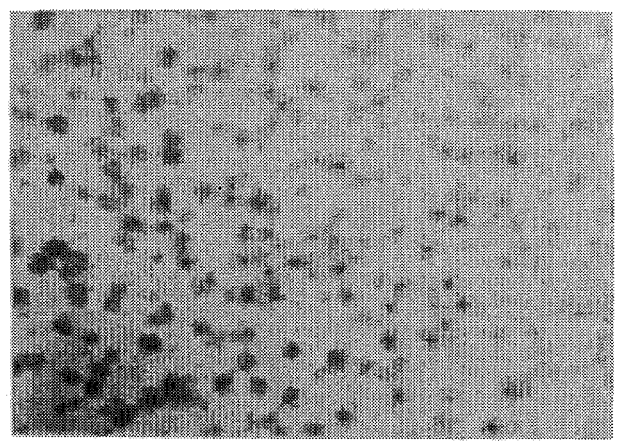

FIG. 32 is an electron micrograph of the product of reduction of FeCl$_3$ at 19,000 times magnification (5,000Å/cm).

Figure 33:
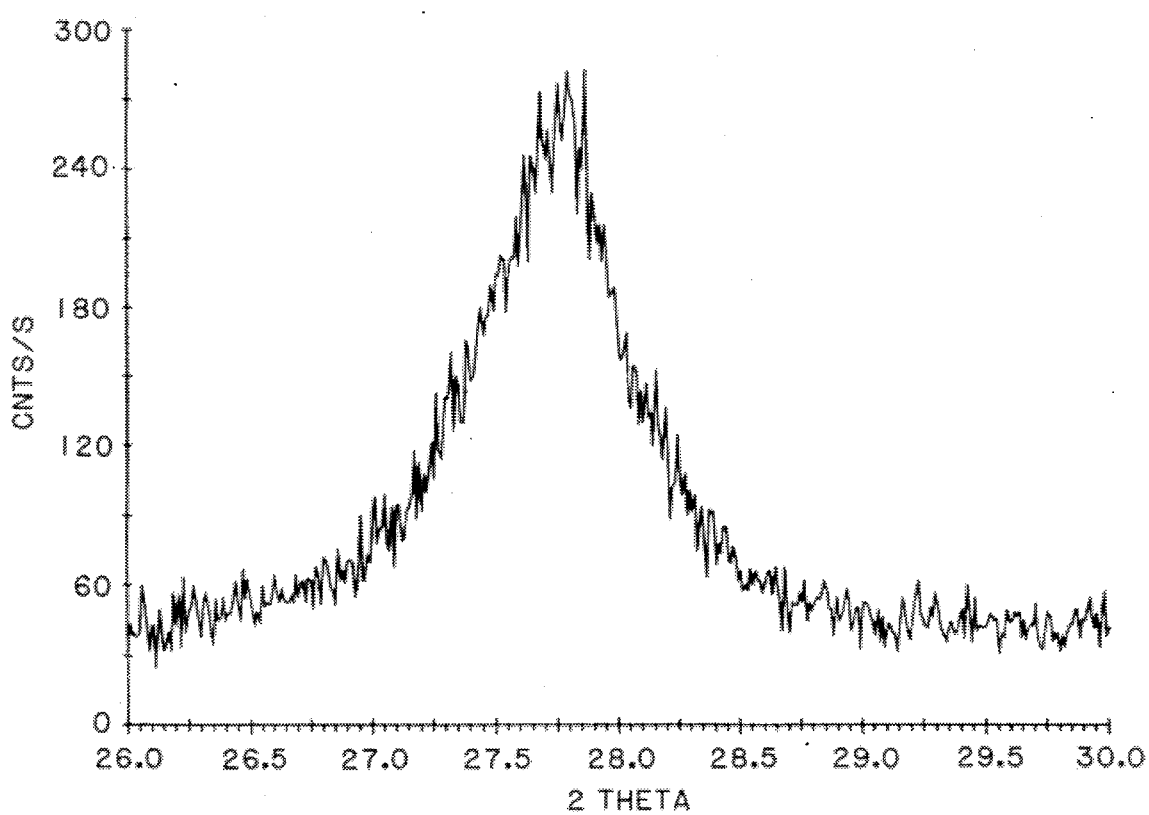

FIG. 33 is an XRD pattern of Te from the reduction of TeBr$_4$ after washing with methanol.

Figure 34:
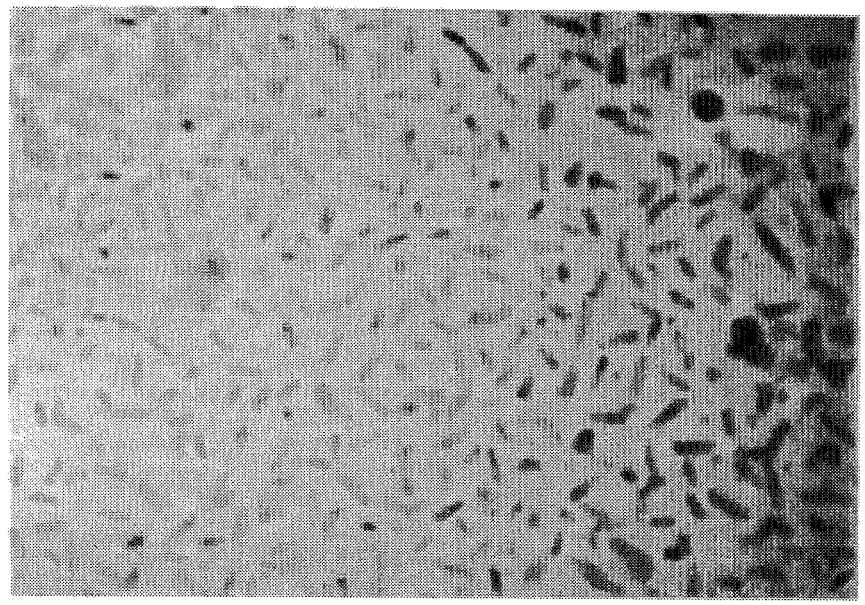

FIG. 34 is an electron micrograph of Te particles at 140,000 times magnification (550Å).

Figure 35:
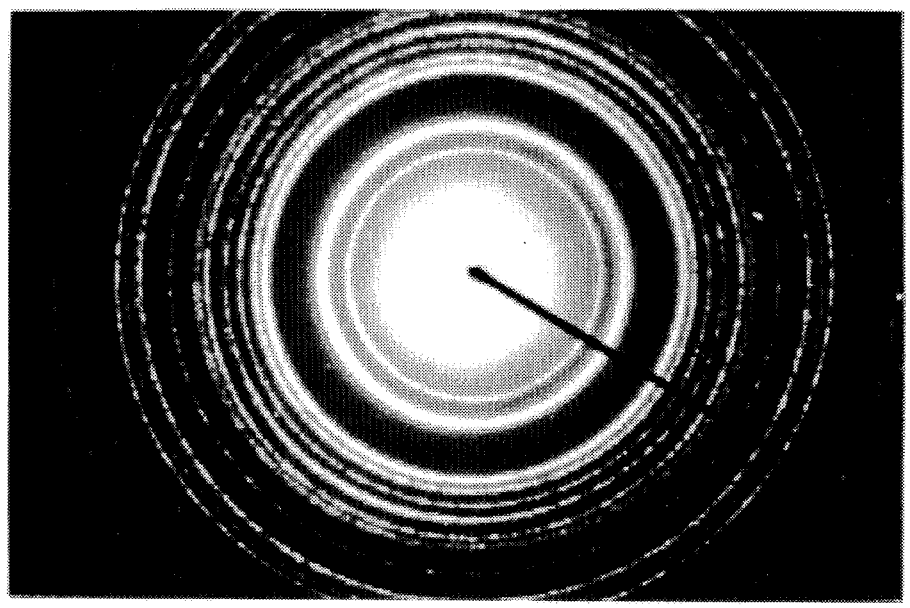

FIG. 35 is a photograph of an electron diffraction pattern of Te particles.

Figure 36A:
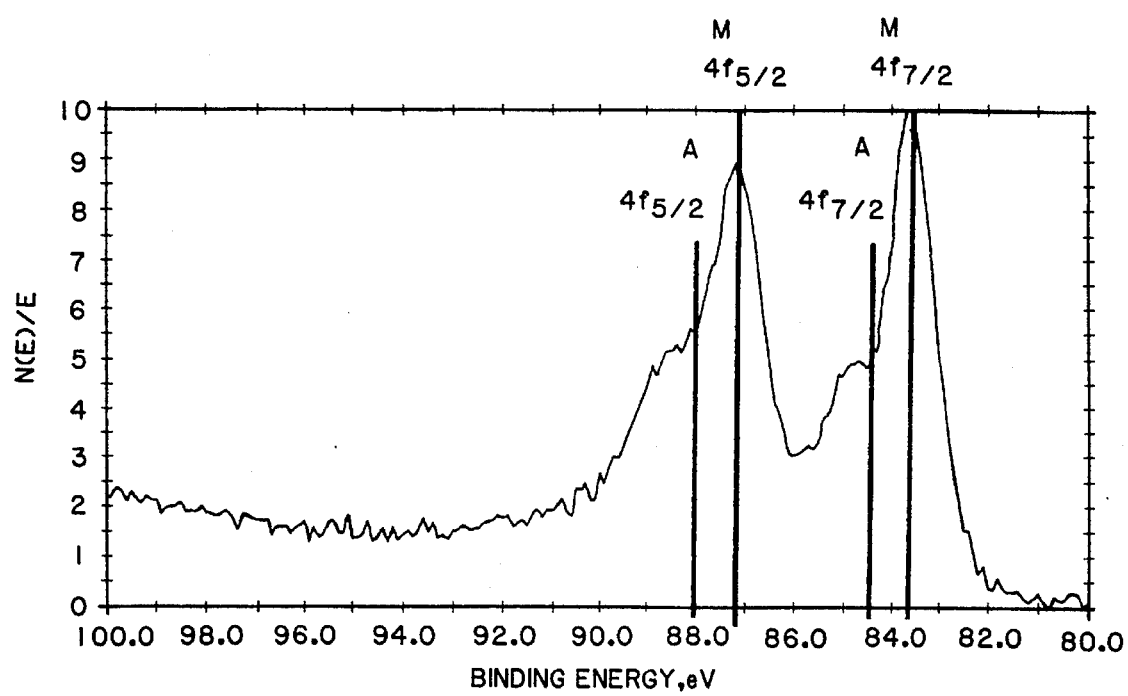
Figure 36B:
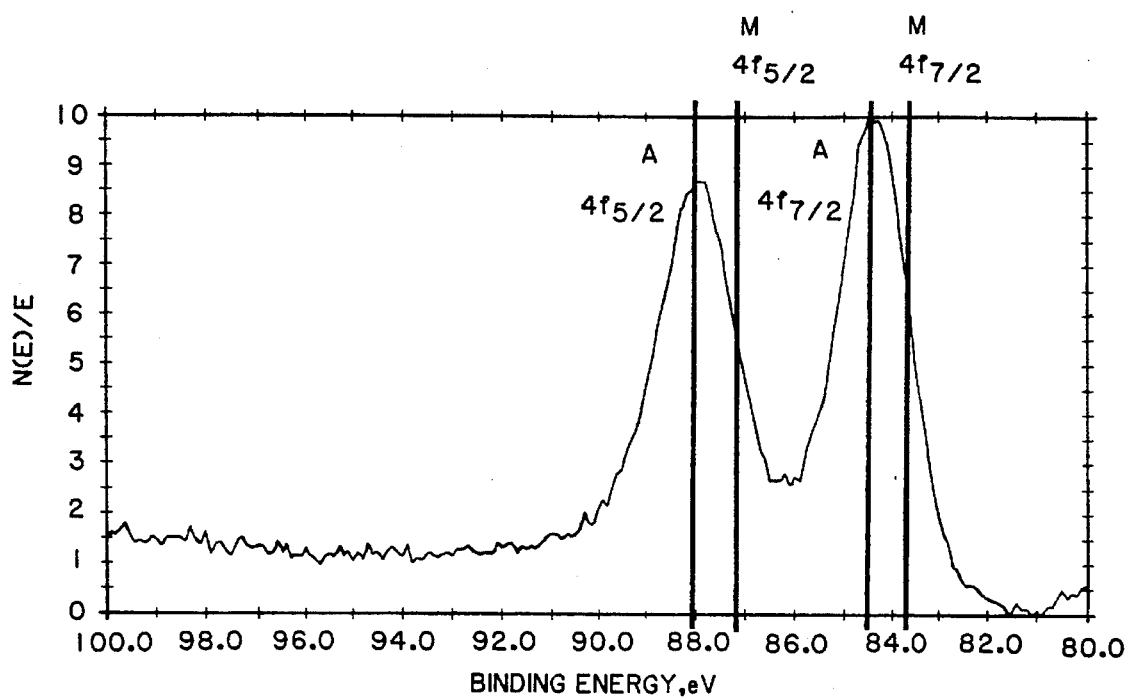
Figure 36C:
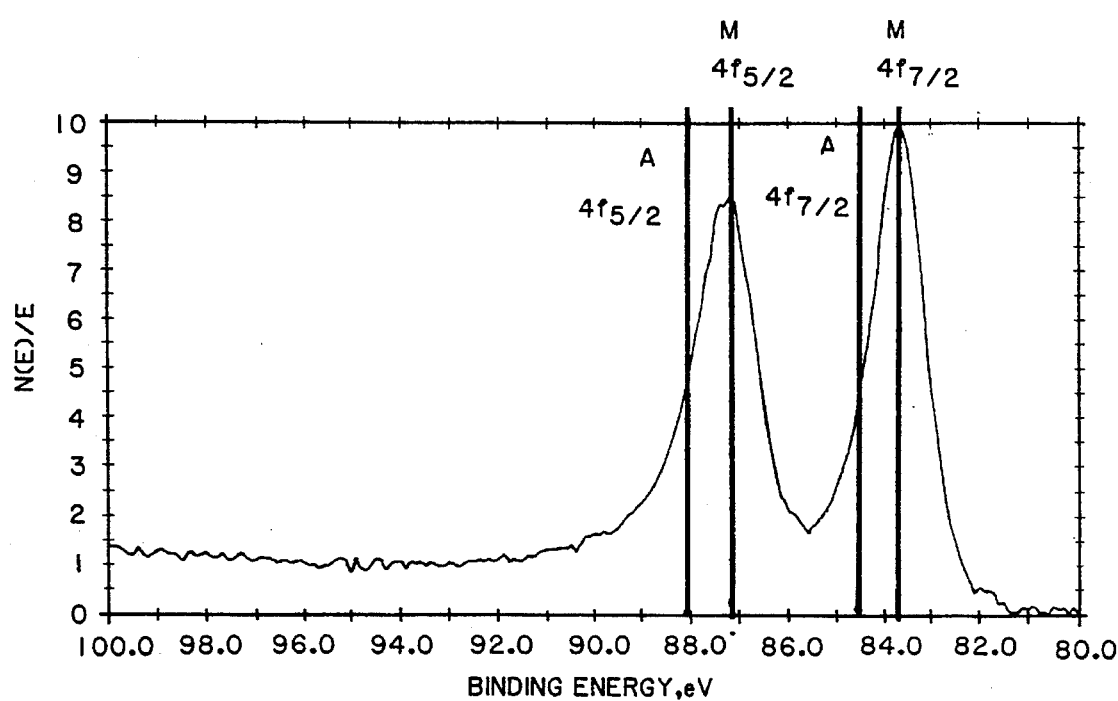

FIGS. 36A, 36B and 36C are graphs showing the Au XPS spectra from the reduction of a mixture of AuCl$_3$ and ZnI$_2$ with AuCl$_3$ present in excess (FIG. 36A), ZnI$_2$ present in excess (FIG. 36B) and from the reduction of AuCl$_3$ only (FIG. 36C).

Figure 37A:
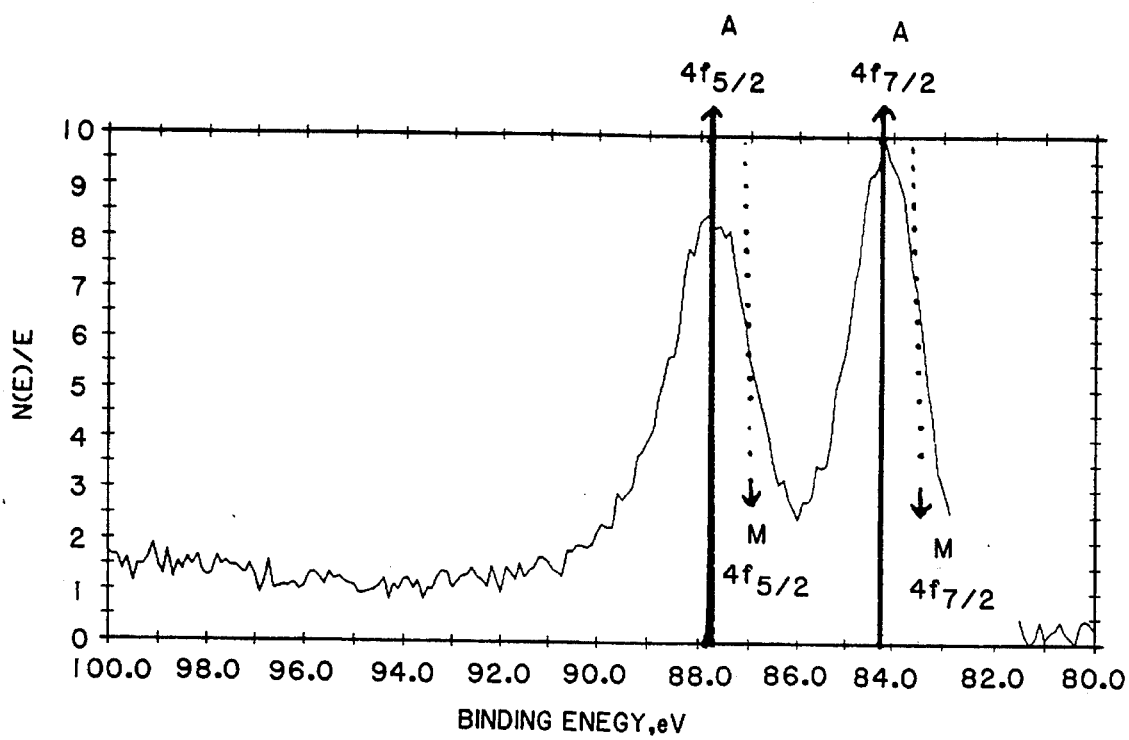
Figure 37B:
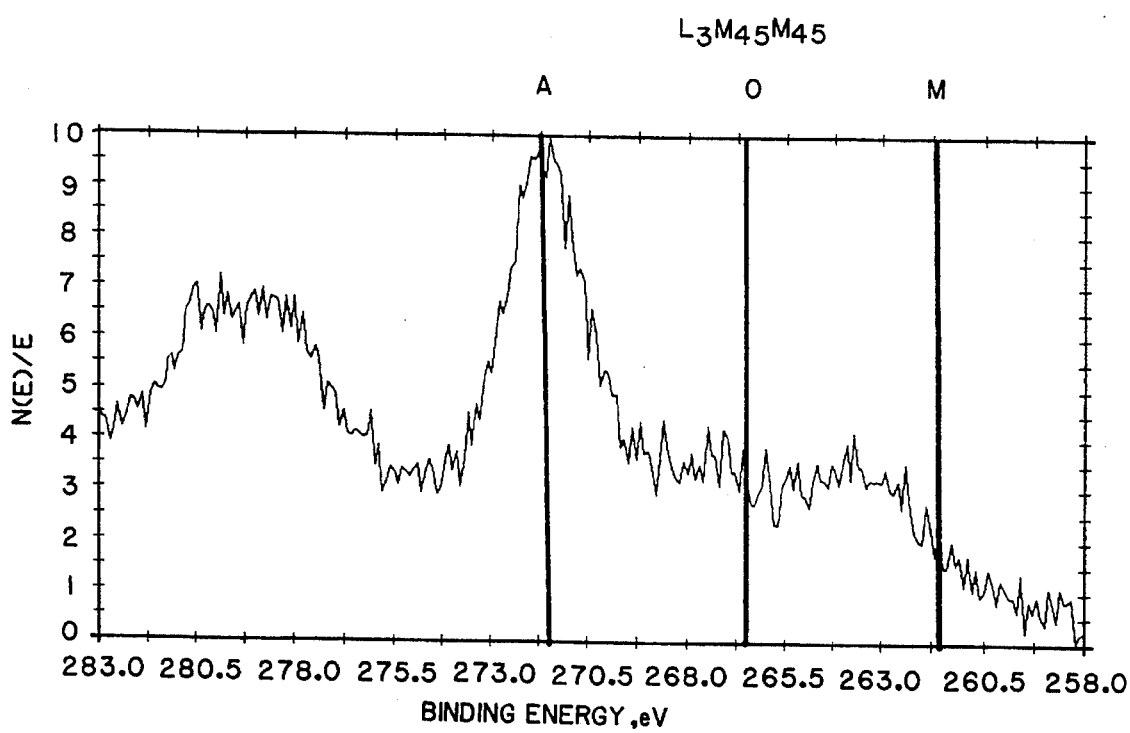

FIGS. 37A, 37B are graphs showing the Au XPS spectrum (FIG. 37A) and Zn Auger spectrum (FIG. 37B) of the compound AuZn formed by reduction of a mixture of AuCl$_3$ and ZnI$_2$.

Figure 38:
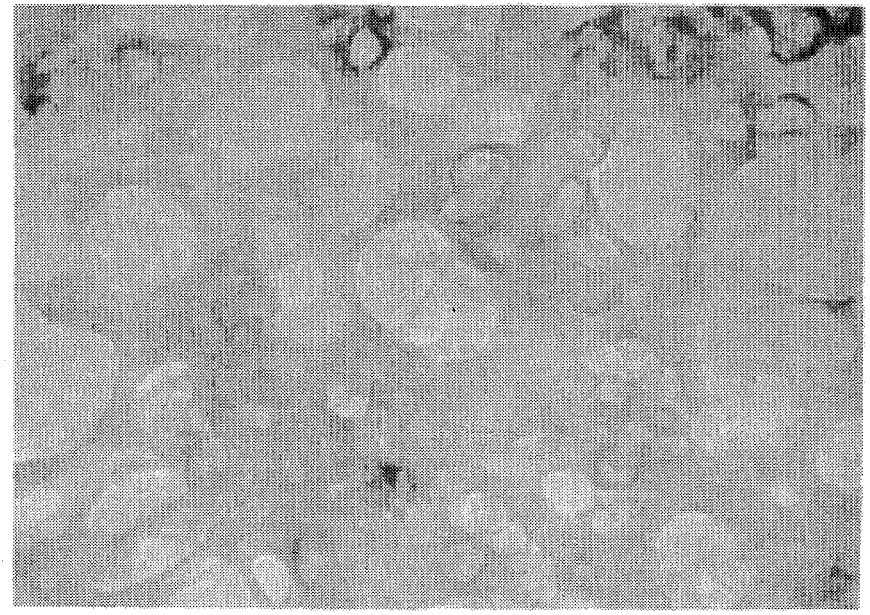

FIG. 38 is an electron micrograph of AuZn at 100,000 times magnification (1000Å/cm).

Figure 39:
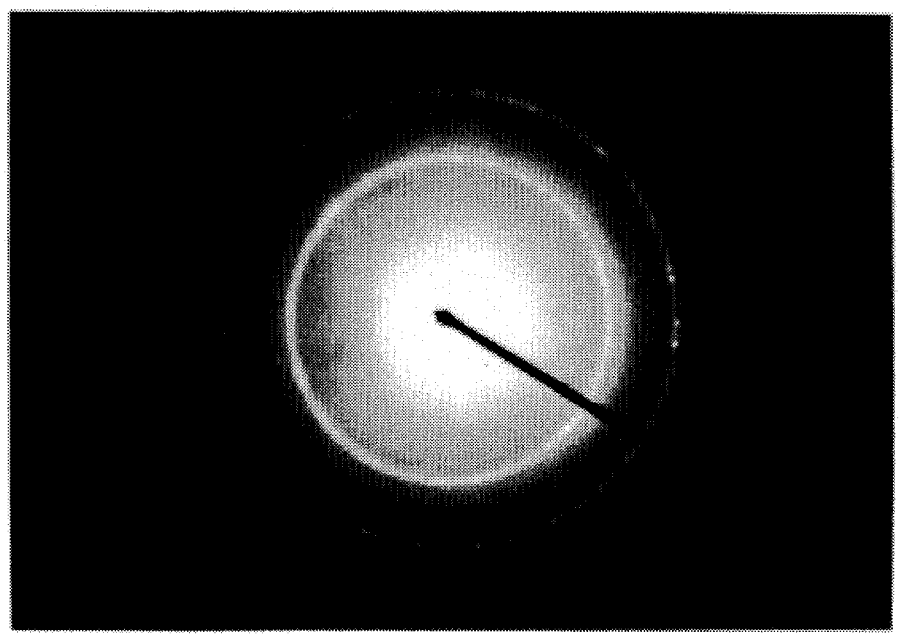

FIG. 39 is a photograph of an electron diffraction pattern of AuZn particles.

Figure 40:
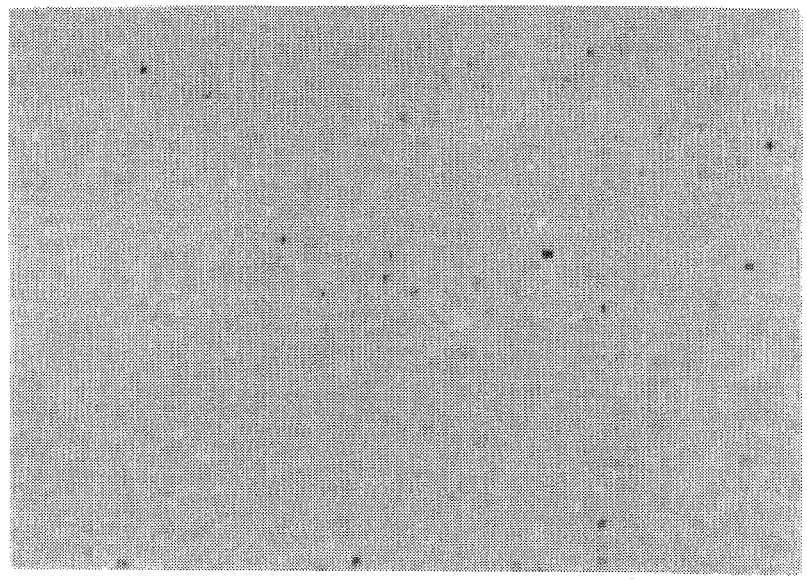

FIG. 40 is an electron micrograph of AuCu at 48,000 times magnification (2,000Å/cm).

Figure 41:
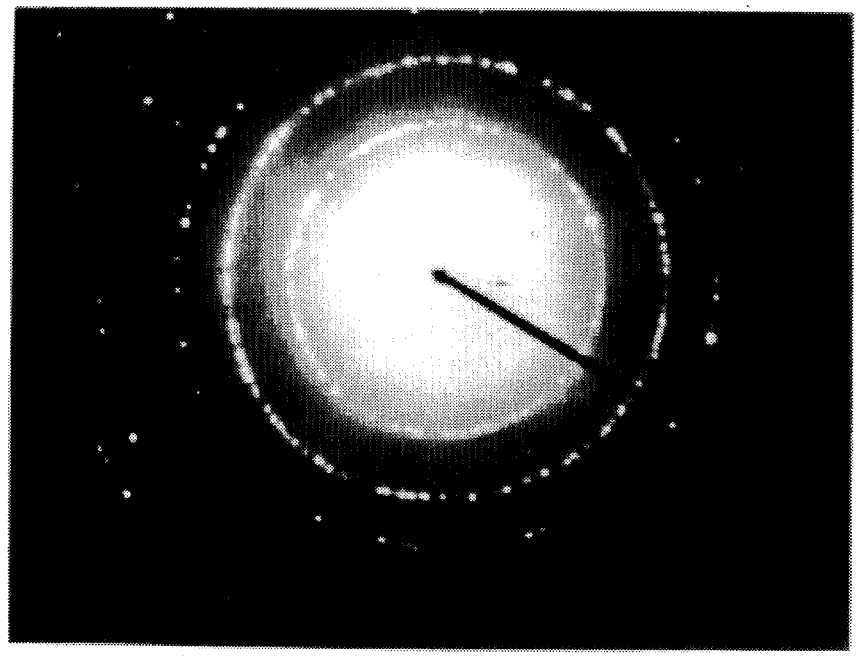

FIG. 41 is a photograph of an electron diffraction pattern of AuCu.

Figure 42:
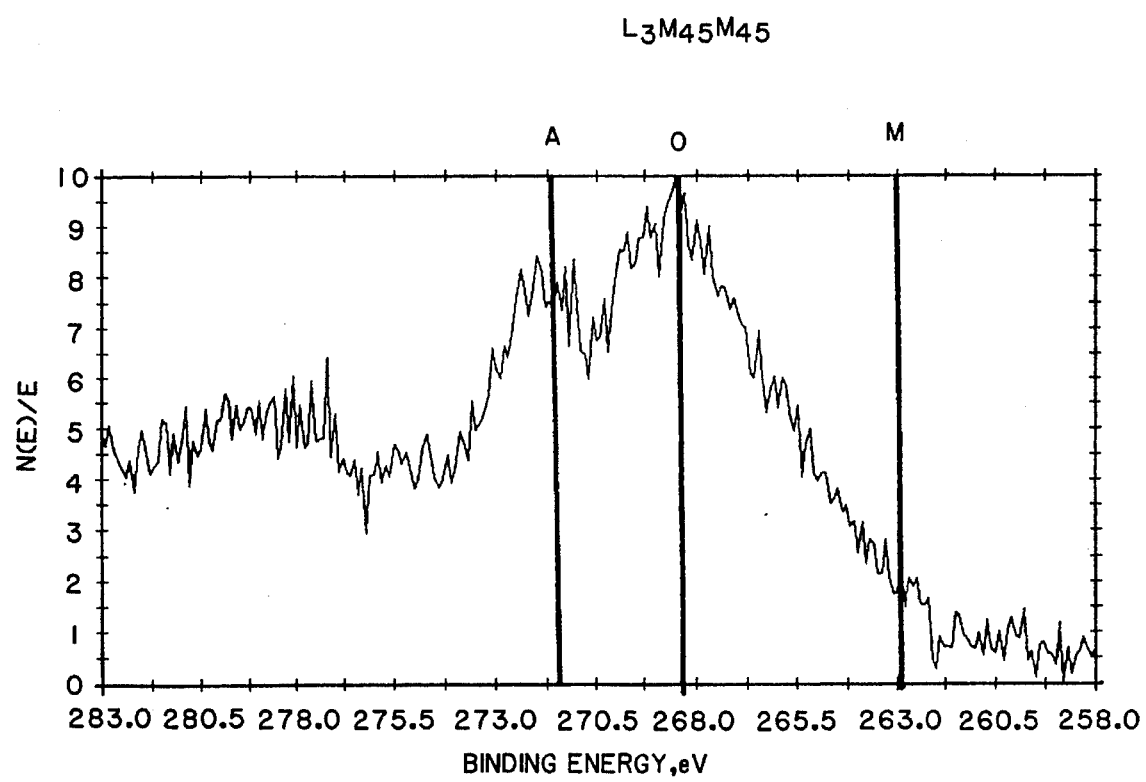

FIG. 42 is a graph showing the XPS Auger spectrum obtained from the products of reduction of a mixture of CuCl$_2$ and ZnI$_2$.

Figure 43:
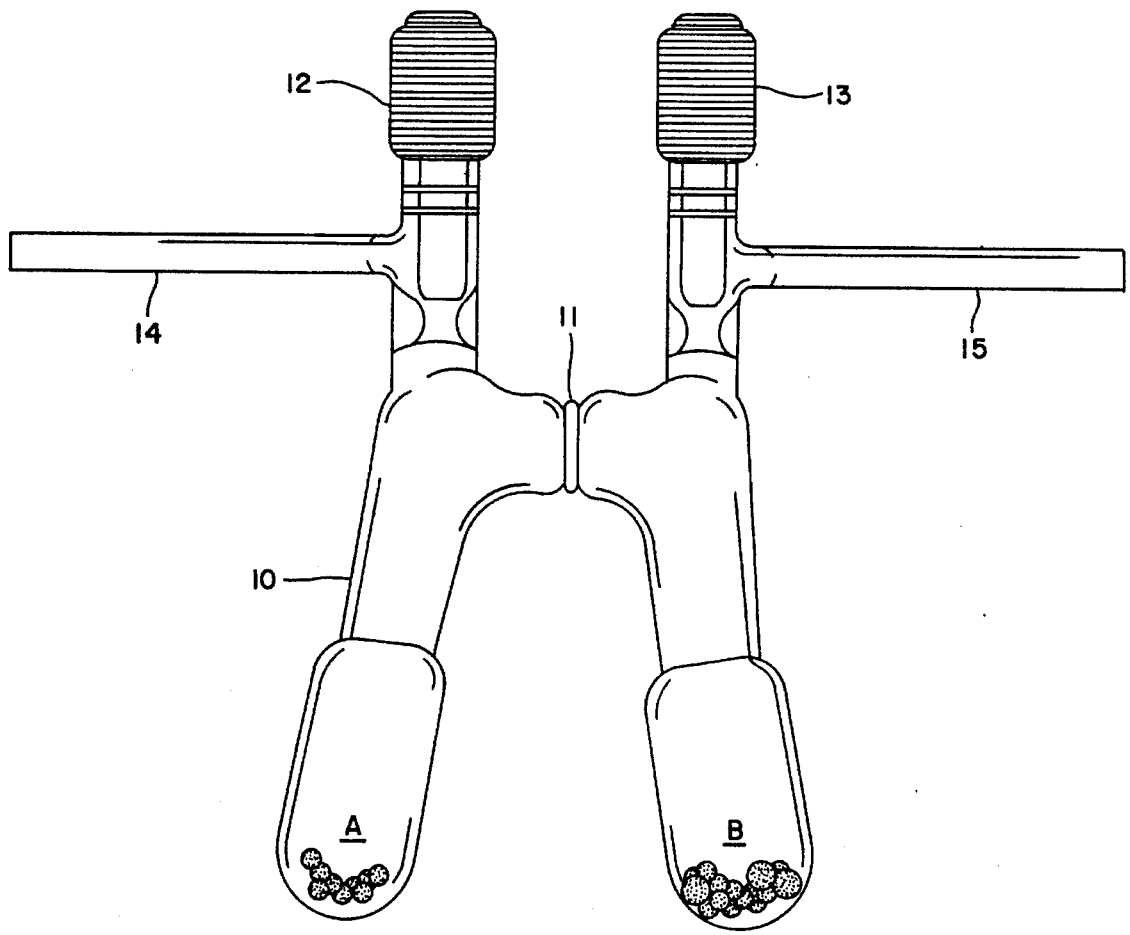

FIG. 43 shows an apparatus 10 for producing the finely divided metal particles.

GENERAL DESCRIPTION

The present invention relates to a process for the production of metals and oxidized metals by reducing a metal salt with a reducing agent the improvement which comprises: reducing in a reaction mixture a metal salt with a reducing agent selected from the group consisting of an electride and an alkalide in an organic solvent and in the absence of an oxidizing atmosphere to produce the metal in a finely divided form in the solvent. The alkalide or electride may be prepared in advance and dissolved to produce the solution, or it may be prepared in situ from the alkali metal(s) and complexant(s).

Further, the present invention relates to a process for the production of metals and oxidized metals which comprises: reducing in a reaction mixture a metal salt with a reducing agent selected from the group consisting of an electride and an alkalide in an organic solvent and in the absence of an oxidizing atmosphere to produce the metal in a finely divided form in the solvent; and separating the metal from the solvent, wherein upon separation the metal is oxidized at least at an exposed surface to an oxidized metal in the presence of oxygen when an oxidizable metal is produced.

The present invention further relates to a reactive metal composition which comprises: a finely divided metal having a particle size between about 20 and 500 Angstroms produced by reducing a metal salt with a reducing agent selected from the group consisting of an electride and an alkalide; and an organic solvent, wherein the composition is maintained in the absence of an oxidizing atmosphere.

Finally, the present invention relates to a catalyst which comprises: a finely divided metal with a particle size between about 20 and 500 Angstroms produced by reducing a metal salt with a reducing agent selected from the group consisting of an electride and an alkalide to produce a metal or oxide of the metal upon oxidation of the metal; and a non-reactive support having the metal or oxide of the metal deposited thereon.

The solvated electron, $e_s^-$, is the most powerful reducing agent possible in a given solvent. Any better reducing agent would react with the solvent to produce solvated electrons. In addition to its thermodynamic reducing ability, the solvated electron also usually reacts rapidly with metal ions and with simple compounds in which a metal is in a positive oxidation state. Alkali metal anions, $M^-$, are nearly as effective as $e_s^-$ and can provide two electrons within a single encounter.

The electrides and/or alkalides which can be used in the process of the present invention include for instance preferably:

(1) Crown Ether Compounds $K^{+}(18$-crown-6$)K^-$, $K^+$ (18-crown-6)$e^-$; general; $M^+$(18-crown-6)$_n N^-$ where M and N are alkali metals and n=1 or 2, (for electrides $N^- = e^-$). Similar compounds with 15-crown-5 in place of 18-crown-6 or with 12-crown-4 or other complexants of the crown-ether class including mixtures of two different crown-ethers:

2) Cryptands $Na^+$(Cryptand[2.2.2])$Na^-$ or generally $M^+$(Cryptand [m.n.o.])$N^-$ including the case of $N^- = e^-$ for electrides:

3) Other Complexants

Any complexant for an alkali metal cation that is not easily reduced by the trapped electron or alkali metal anions, such as the aza-analogs of crown ethers and cryptands, similar cages with other than —$CH_2CH_2$— linkages between the oxygen or nitrogen atoms, simple amines such as methylamine, ethylamine, ethylenediamine, other di-, tri- and tetra-amines etc. that can form alkalides or electrides of the generic formulas $M^+$ (Complexant)$mN^-$ or $M^+$ (Complexant)$_m e^-$. $M^+$ and $N^-$ are selected from sodium, potassium, cesium, rubidium and lithium. The essential feature is a soluble compound that provides $N^-$ or $e^-$ when dissolved in a suitable aprotic organic solvent.

The organic solvents which can be used in the present invention are unreactive with the electride or alkalide. Possible solvents are dimethyl ether, diethyl ether tetrahydrofuran, dimethoxy ethane, other polyethers. Reducible solvents cannot be used. The reaction temperature is preferably between −80° C. and 20° C.

The non-oxidizing atmosphere can be provided by various non-reactive gases. Included are nitrogen, argon, helium, and other noble gases. Reaction in vacuo where the vaporized solvent forms the protective atmosphere can be performed.

The reaction of all of the soluble metal compounds that contain oxidized forms of gold (Au), zinc (Zn), molybdenum (Mo), gallium (Ga), tin (Sn), iron (Fe), copper (Cu), titanium (Ti), nickel (Ni), tellurium (Te), antimony (Sb), tungsten (W), vanadium (V), silicon (Si), aluminum (Al) and germanium (Ge), with the electrides or alkalides is generally essentially complete upon mixing. The presence of a stable blue color after addition of excess reductant electride or alkalide indicates that the reduction is complete and further that the metal solution is not being catalytically decomposed. Generally, a colloidal suspension of the metal (or metal oxide) is first produced as indicated by light scattering and color, followed by slow aggregation of the colloid to a precipitate that can be separated by simple centrifugation. The metals which can be reduced are in Groups IB to VIIIB and Group IIIA to Group VIA, including atomic numbers 13, 14, 21–34, 39–52, 57–83, 89 and above.

As an example, a typical reaction scheme between potassium (15-crown 5)$_2$ potasside [$K^+$(15C5)$_2 K^-$] and tin (IV) chloride (SnCl$_4$) is presumed to follow the scheme

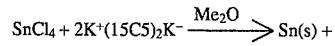
$SnCl_4 + 2K^+(15C5)_2K^- \xrightarrow{Me_2O} Sn(s) +$

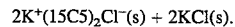
$2K^+(15C5)_2Cl^-(s) + 2KCl(s).$

The by-products have been identified by x-ray diffraction (XRD). Thus, the initial colloid and precipitate contain not only tin metal, but also the other products of reaction. For a metal as inert as tin, a wash with de-oxygenated water leaves the metal with a thin layer of oxide or hydroxide. In the case of more active metals such as Ti, no elemental metal is observed after workup. Thus, even just solvent removal leaves an oxidized product.

Since an organic complexant such as a crown ether, cryptand or aza-crown is used to prepare the alkalide or electride and provides for a homogeneous solution, any large-scale use of this methodology would require recycling of the complexant, a process that is certainly feasible. The materials consumed in the reactions are the transition metal compound and the alkali metal, neither of which should be prohibitively expensive for a high value-added product.

The following are important features of the process:

(1) The reduction is general, ranging from Al to Te. The only requirement seems to be starting with a compound which is soluble in the solvent.

(2) It is possible to reduce metal mixtures to form alloys of any desired composition or intimate mixtures of a less active metal and a more active metal, the latter then forming an oxide, alkoxide or other oxidized support. Single or mixed metals can be produced on finely divided support materials, and presumably in the pores of Zeolites or in layered materials.

(3) Particle size, as determined from the width of x-ray diffraction (XRD) lines and from electron microscopy, ranges from less than about 25 Å to several hundred Å.

(4) The process is fast.

(5) The expensive reagents are reusable.

When the metals are produced in situ they can be in a highly reactive form depending upon the metal. This is particularly true of the transistion metals. If oxygen is present then a metal oxide can be formed in whole or in part. Further, if a reactive organic or inorganic compound is present it can react with the metal to form in whole or in part a derivative oxidized metal compound. Thus alkoxides, esters, ethers, oxyacid salts, chelates and the like can be formed in situ in high purity. Further, the metals produced can be used directly to catalyze reactions such as titanium coupling of esters and ethers. The present invention contemplates such further reactions of the metals produced by the process of the present invention.

SPECIFIC DESCRIPTION

INSTRUMENTATION

1. X-ray Photoelectron Spectroscopy (XPS or ESCA)

XPS involves the energy analysis of electrons ejected from a surface under bombardment by x-rays. The photoelectron ejection process occurs when a core level electron absorbs a photon of energy greater than its binding energy. When this occurs, the electron is ejected from the atom with an energy characteristic of the exciting photon and the initial core level binding energy.

$E = H^v - E_b$

Figure 1:
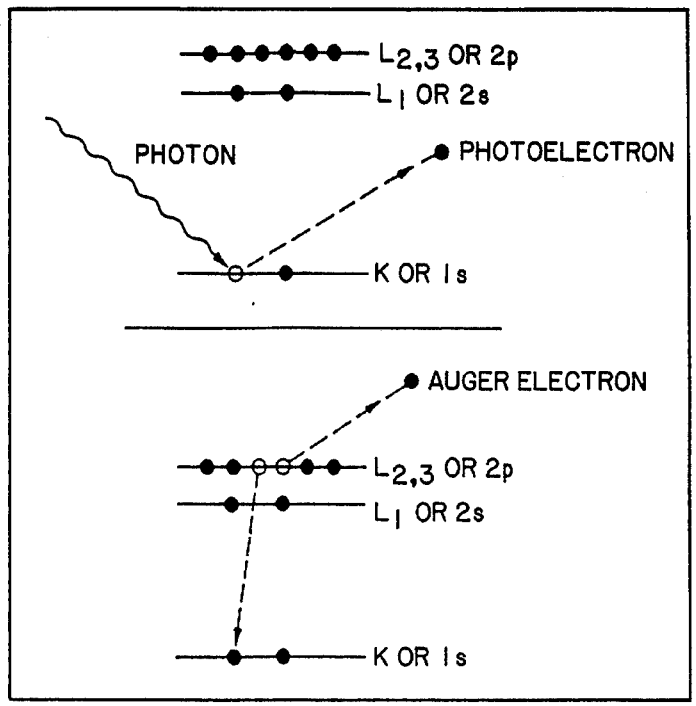
FIG. 1 is a schematic view of a photoelectric and auger process of electron removal by x-rays on a surface.

E is the kinetic energy of the photoelectron $h^v$ is the x-ray photon energy $E_b$ is the photoelectron binding energy When a sample is illuminated by an intense source of photons of a single well-defined energy, the resultant photoelectrons can be resolved into energy peaks characteristic of the emitting atoms. In addition to the photoelectron emitted in the photoelectric process, Auger electrons are emitted due to relaxation of the energetic ions that remain after photoemission. Auger electron emission occurs about $10^{-14}$ sec. after the photoelectric event. Thus, photoionization often leads to two emitted electrons, a photoelectron and an Auger electron as shown in FIG. 1.

Figure 2:
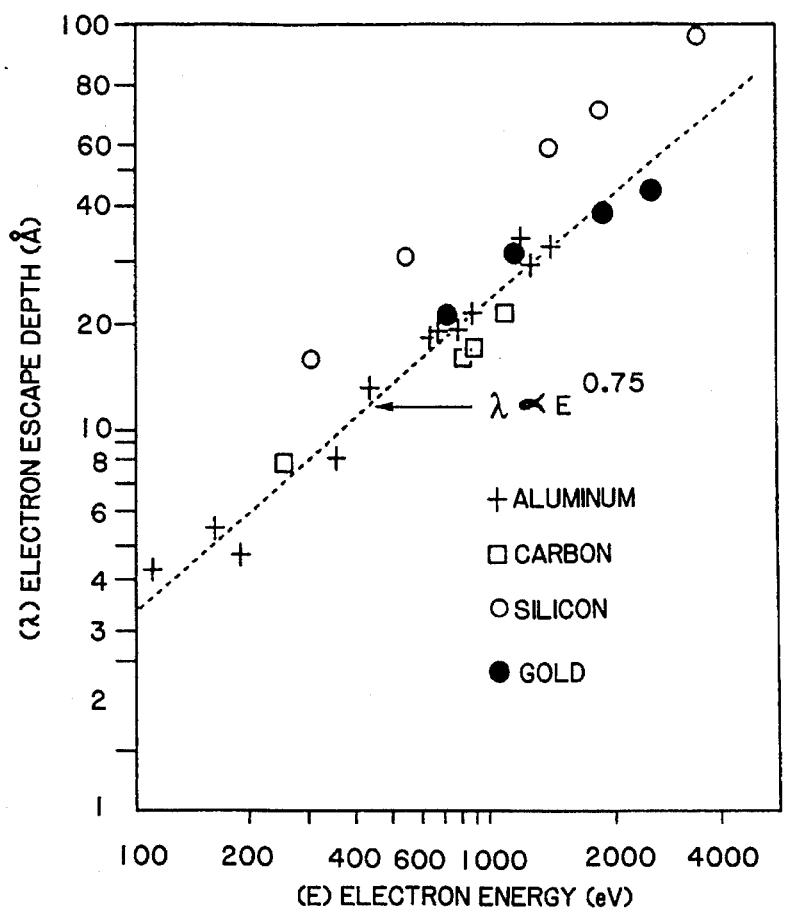
FIG. 2 is a graph showing the electron mean free path of an electron released by a particular material bombarded by x-rays.

The path length of the photons is of the order of micrometers, but that of the electrons is of the order of ten Angstroms. Thus, while ionization occurs to a depth of a few micrometers, only those electrons that originate within tens of Angstroms of the solid surface can leave the surface without energy loss. It is these electrons that produce the peaks in the spectra and are most useful. Those that undergo loss processes before emerging contribute to the background. Experimental data on the mean free paths of electrons in various materials are shown in FIG. 2.

The XPS measurements reported here were performed with a Perkin Elmer PHI 5400 ESCA/XPS™ spectrometer (Eden Prairie, Minn.). Unmonochromatized MgK alpha x-ray sources were used at 15 KV and 300 W. The work function of the instrument was calibrated by measuring the binding energy of Au $4f_{7/2}$ at 84.0±0.1 eV. During experiments the pressure inside the analyzer chamber was about $10^{-8}$ torr. Ion bombardment to etch away sample surfaces was carried out with an argon ion gun. Both photoelectron and AUGER peaks could be obtained by XPS.

2. X-Ray Diffraction Powder Patterns (XRD)

The mean dimension, $D_{hkl}$, along the Miller index hkl of the crystallites of a powder as related to the pure x-ray diffraction line broadening was calculated by Scherrer's equation $Dhk_1 = 0.9 \lambda / \beta \cos \theta$ in which $\lambda$ is the wavelength of the x-ray $\beta$ is the angular width at half-maximum intensity $\theta$ is the Bragg angle A Rigaku™ (Rotaflex model; Danvers, Me.) x-ray powder diffractometer using a rotating anode and monitored with a Microvax™ computer was used. Data were recorded at 45 KV and 80 mA with the CuKalpha radiation.

3. Transmission Electron Microscopy (TEM), Energy Dispersive Spectra (EDS) and Electron Diffraction Patterns All micrographs were taken with a JEOL 100 CXII™ Transmission Electron Microscope (Peabody, Me.) using 100 KV accelerating voltage. Energy Dispersive Spectra (EDS) were recorded with a Link Systems AN 10000™ (Redwood City, Calif.). The Electron Microscope was also used to obtain the Electron Diffraction Patterns.

SAMPLE PREPARATION

All the metal salts were purchased in the highest available purity. Liquid samples were $TiCl_4$ (99.995+%), $GeCl_4$ (99.999%), $SiCl_4$ (99.999%), $SbCl_4$ (99%) and $SnCl_4$ (99.999%). Solid samples were $CuCl_2$ (99.9999%), $GaCl_3$ (99.99%), $ZnI_2$ (99.99%), $AlCl_3$ (99.9%), $MoCl_5$ (99.99%), $FeCl_3$ (98%) and $AuCl_3$. A 0.25 mm thick 99.99% indium foil was used to mount the samples for XPS and XRD studies.

As shown in FIG. 43, a few milligrams of the desired compound A were added to one side of an evacuated H-cell 10 made of borosilicate glass as shown in FIG. 43 with a medium frit 11 in a He-filled dry box (not shown). The cell 10 was fitted with Kontes™ (Morton Grove, Ill.) vacuum valves 12 and 13. Vacuum was drawn through tubes 14 or 15. Enough alkalide or electride B was added to the other side of the H-cell 10 in a nitrogen-filled glove bag. A liquid nitrogen bath was used to cool the cell 10 to prevent decomposition of the alkalide or electride B. Prepurified dimethyl ether was introduced as the solvent into the alkalide or electride under vacuum after pumping out the helium gas to about $10^{-5}$ torr while the cell was kept in a −80° to 20° C., preferably −50° C. isopropanol bath.

The blue solution of the alkalide or electride was poured through the frit 11 to react with the solution of the metal compound A to be reduced after both solids had been completely dissolved in dimethyl ether. The reaction was complete immediately after the addition of alkalide or electride as indicated by fading of the blue color. A slight excess of alkalide or electride was added until the blue color no longer disappeared to make sure that the reaction was complete. Different colors of various colloids were formed at the same time. Then the dimethyl ether was distilled out under vacuum.

The products were removed from the walls of the H-cell 10 and mounted on an indium foil in the He dry box. A vacuum transfer apparatus was used to carry the sample from the dry box to the XPS chamber without exposing the sample to the air. In some cases deionized and degassed distilled water or methanol was used to wash away the by-products. Washing was performed by centrifugation to separate the undissolved metallic particles from the water or methanol soluble by-products. XRD patterns were recorded by placing the precipitate on indium foil either with or without washing. A drop of washed suspension was put on the TEM grid or the grid was dipped into the suspension and allowed to dry in the air, after which TEM micrographs, EDS, and electron diffraction patterns were made.

EXAMPLE 1

Gold

Figure 3:
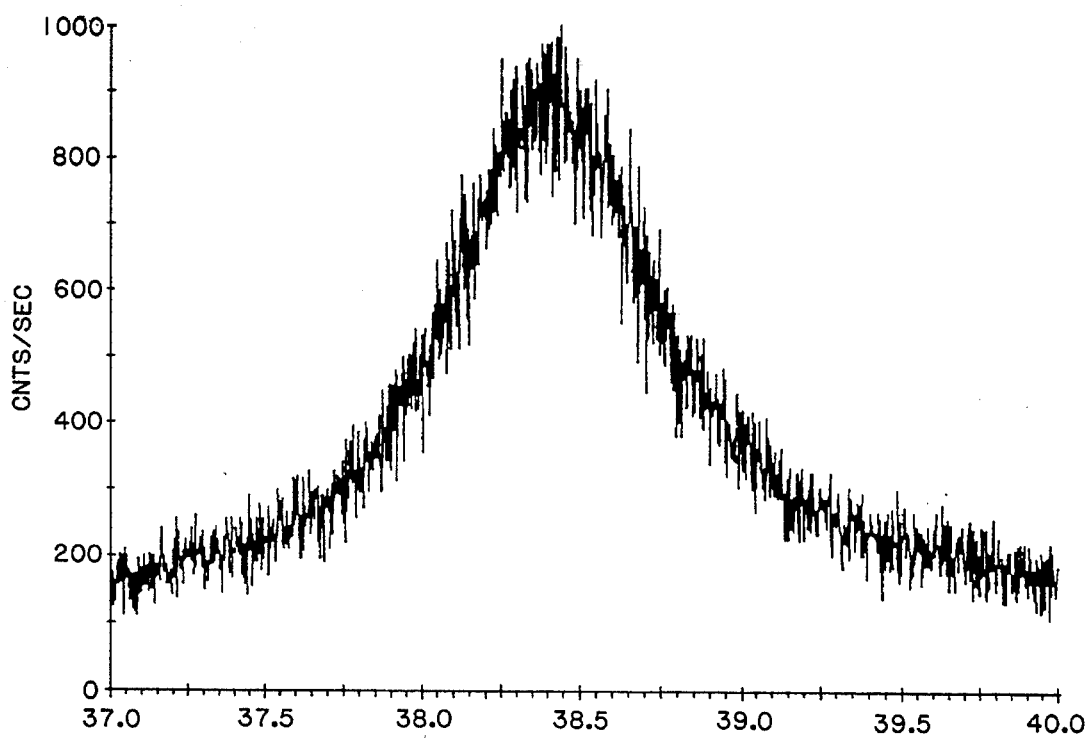
FIG. 3 is a graph showing an x-ray diffraction (XRD) pattern of Au particles from the reduction of $AuCl_3$, which was not washed.
Figure 4:
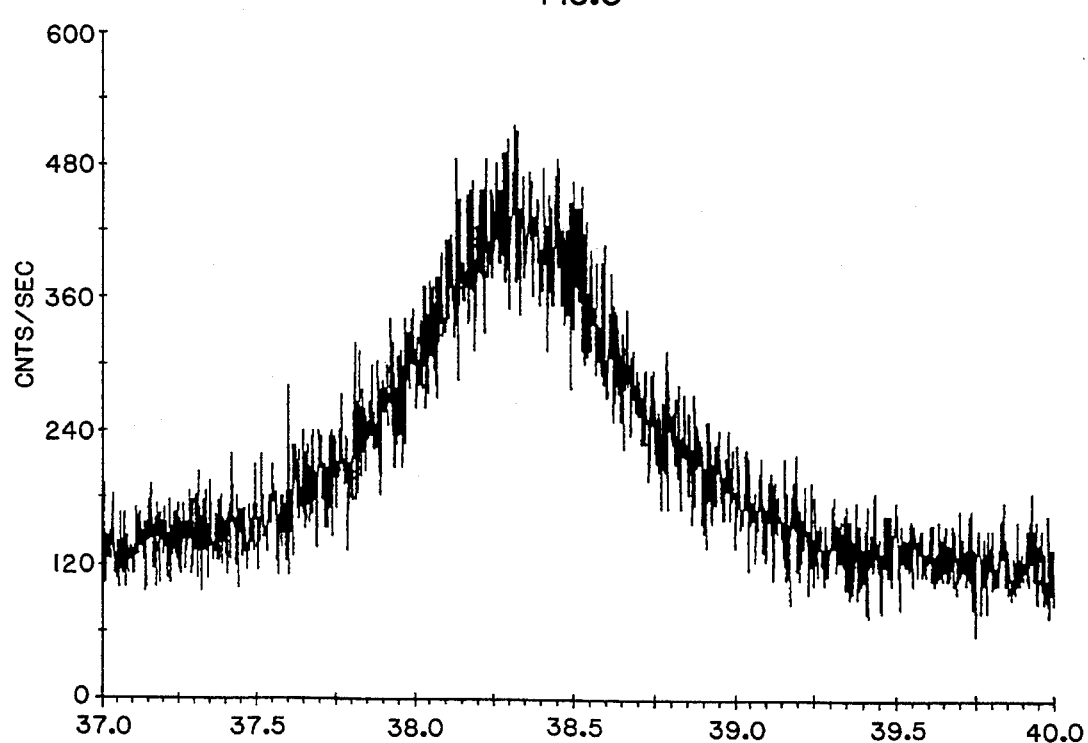
FIG. 4 is a graph showing an XRD pattern of Au particles from the reduction of $AuCl_3$, which was washed with methanol.

Gold Chloride, $AuCl_3$, was reduced by the alkalide, $K^+$ $(15C5)_2K^-$, to produce small metallic gold particles. Note that $K^+$ (15C5)$_2$K$^-$ is the nominal composition used. Other studies show that both $K^+$ (15C5)$_2$K$^-$ and $K^+$ (15C5)$_2$e$^-$ are present unless the compound is carefully recrystallized. The products were fully characterized by x-ray powder diffraction, electron diffraction and x-ray photoelectron spectroscopy. Only metallic gold peaks were detected by XRD from the precipitates after washing away the by-products, $K^+$ (15C5)$_2$Cl$^-$ and KCl. The mean particle size of the strongest peak of Au (III) from the x-ray line broadening, as shown in FIG. 3, is about 100 Å before washing. FIG. 4 shows that the mean particle size from a different run was about 70 Å after two washes with water.

Figure 5:
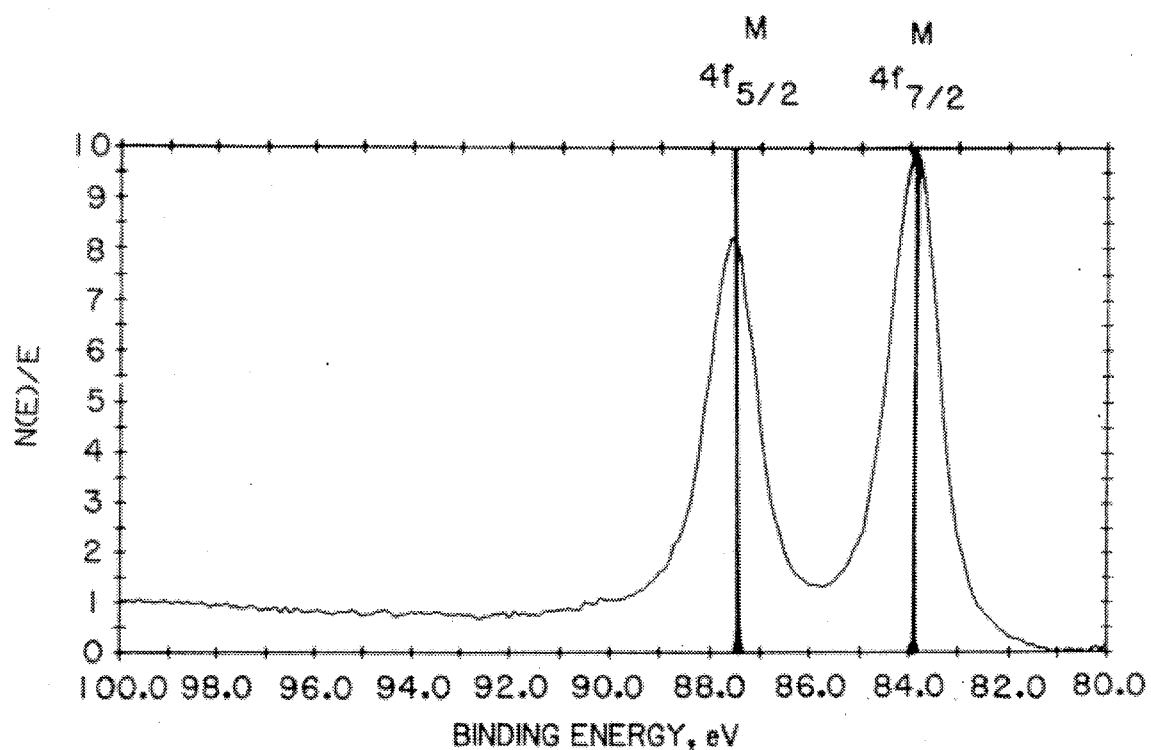
FIG. 5 is a graph showing an x-ray photoelectron spectrum (XPS) of Au produced by reduction of $AuCl_3$. In all XPS and Auger spectra, M, O, A represent peaks due to metal, oxidized metal and compound, respectively.
Figure 6:
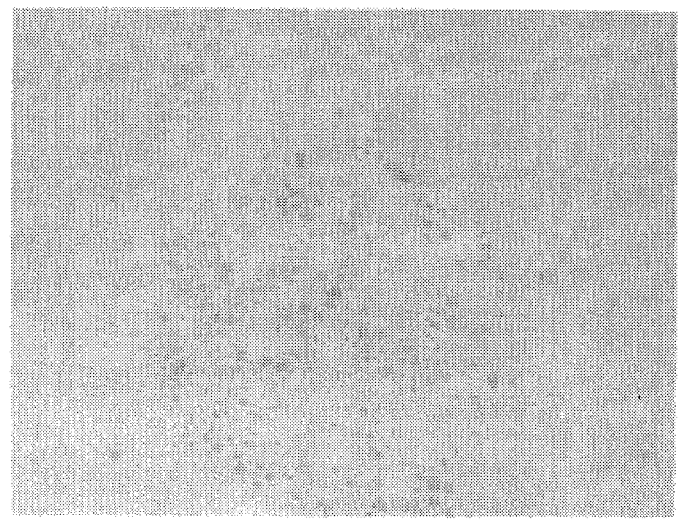
FIG. 6 is an electron micrograph of Au particles produced by the process.
Figure 7:
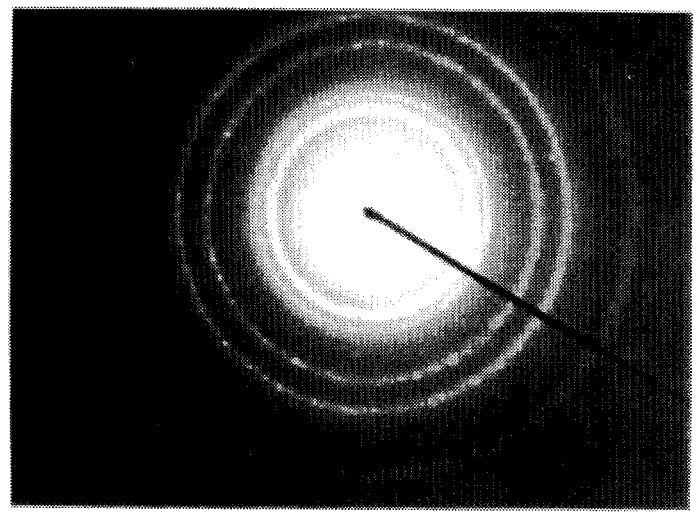
FIG. 7 is a photograph of an electron diffraction pattern of Au particles.

The small black metallic Au particles were also characterized by XPS and only the $4f_{7/2}$ peak at 83.9 eV and the $4f^{5/2}$ peak at 98.7 eV appear on the XPS spectra of FIG. 5, showing that these particles are metallic gold. The micrograph of FIG. 6 with a magnification of 320,000 agrees well with the particle size of about 100 Å as measured by x-ray line broadening of gold produced in the same run. A selected area electron diffraction pattern was also taken from the same area shown in the micrograph of FIG. 6. The ring pattern of FIG. 7 matches all of the d-spacings of metallic gold.

Figure 8:
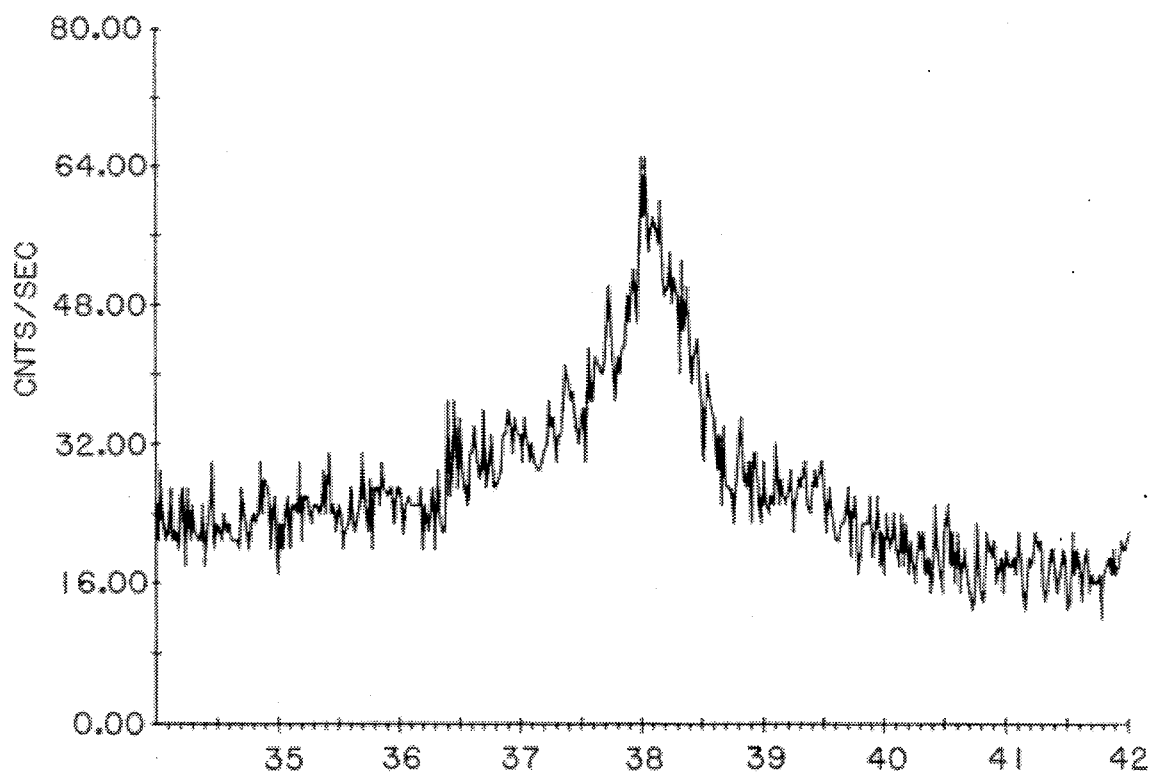
FIG. 8 is a graph of an XRD pattern of Au on $Al_2O_3$.
Figure 9A:
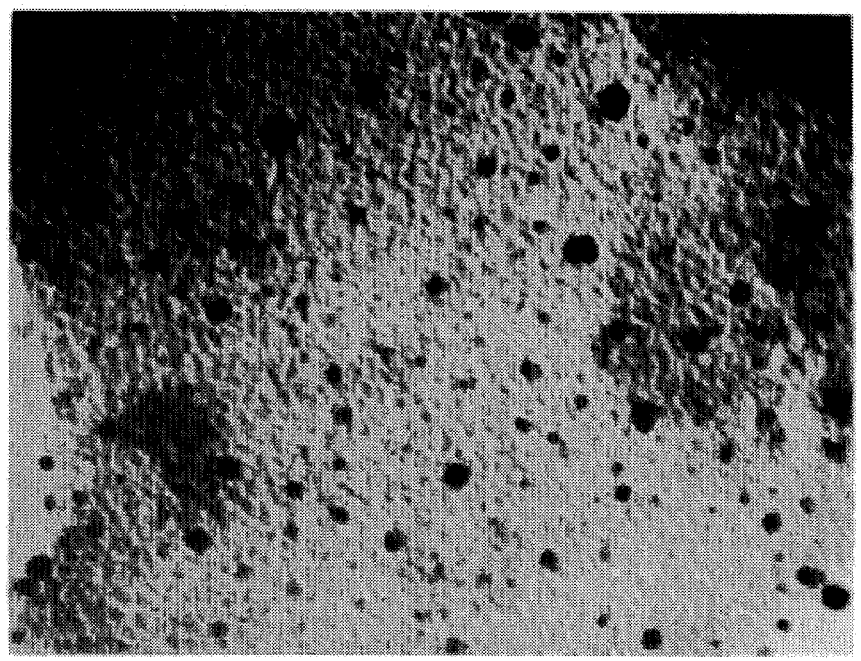
FIGS. 9A and 9B are electron micrographs of gold particles on Al$_2$O$_3$ at a magnification of 190,000 (550 Angstroms per cm).
Figure 9B:
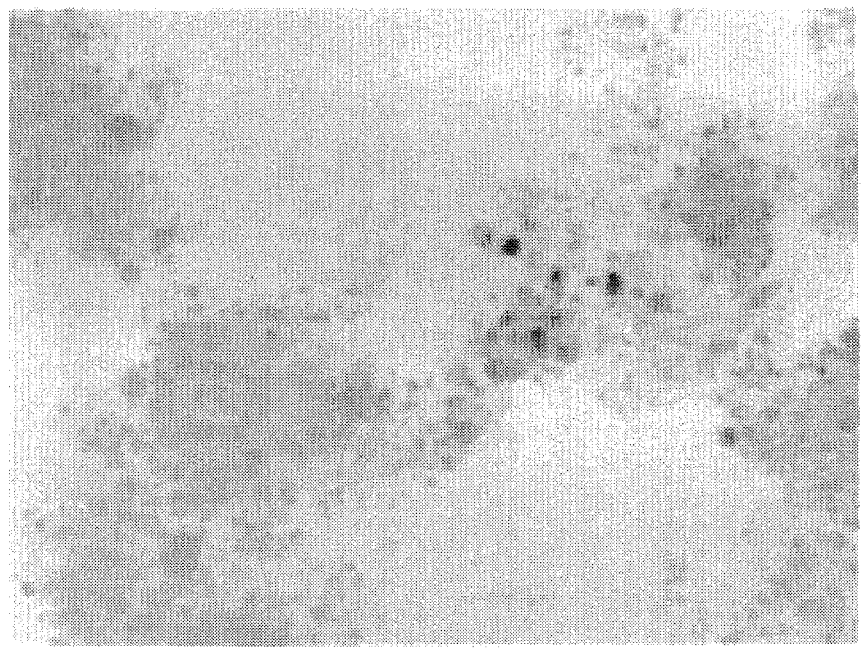

It was also possible to do the reduction in the presence of finely divided alumina (Al$_2$O$_3$) with a specific surface area of 158 m$^2$/g. One gram of Al$_2$O$_3$ and a few milligrams of AuCl$_3$ were combined in one arm of the H-cell, reduction was conducted as before. The final purple product was confirmed to be Au deposited on Al$_2$O$_3$ by both XRD and TEM. The mean Au particle size shown in FIG. 8 is about 50 Å. From the TEM micrograph shown in FIGS. 9A and 9B with a magnification of 190,000, the Au particles (black spots) are seen to be deposited uniformly on the surface of Al$_2$O$_3$.

EXAMPLE 2

Zinc

Figure 10A:
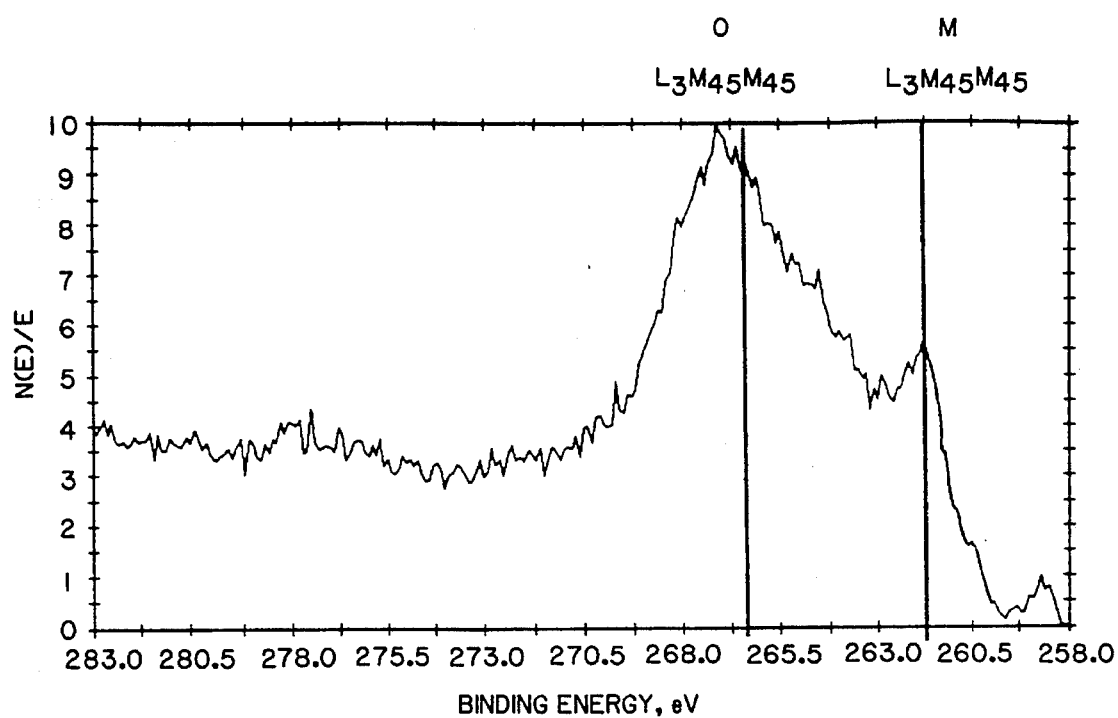
FIGS. 10A, 10B and 10C are graphs showing XPS Auger Peak spectra of zinc particles from the reduction of ZnI$_2$ before and after Argon sputtering to remove an oxide coating.
Figure 10B:
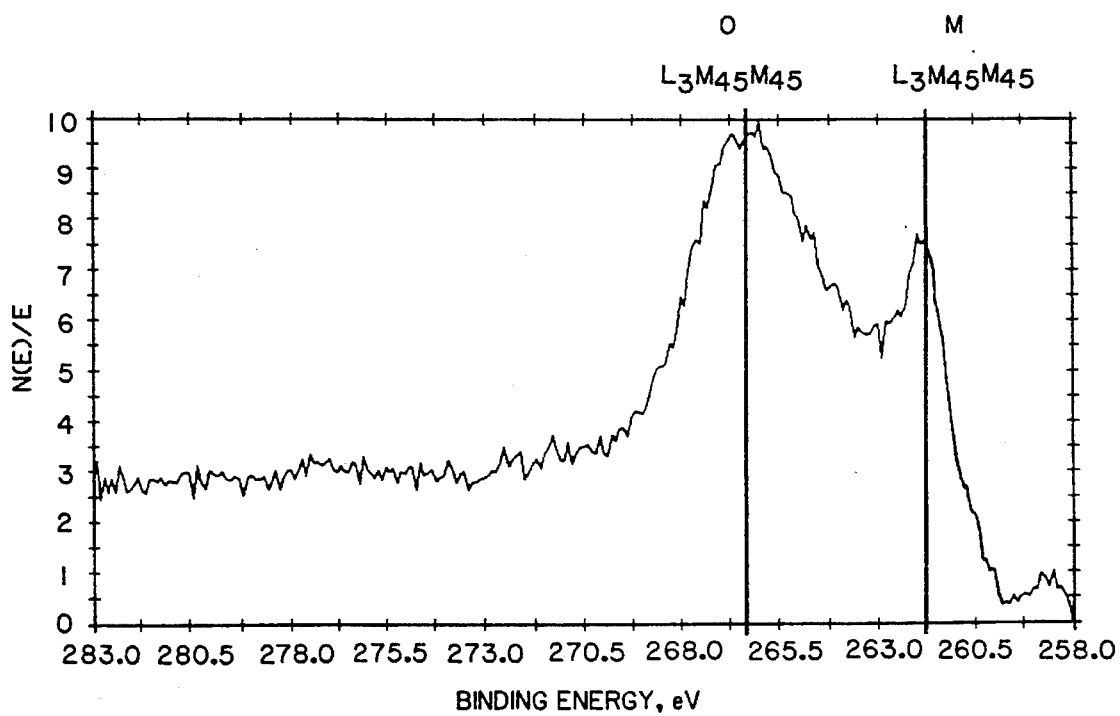
Figure 10C:
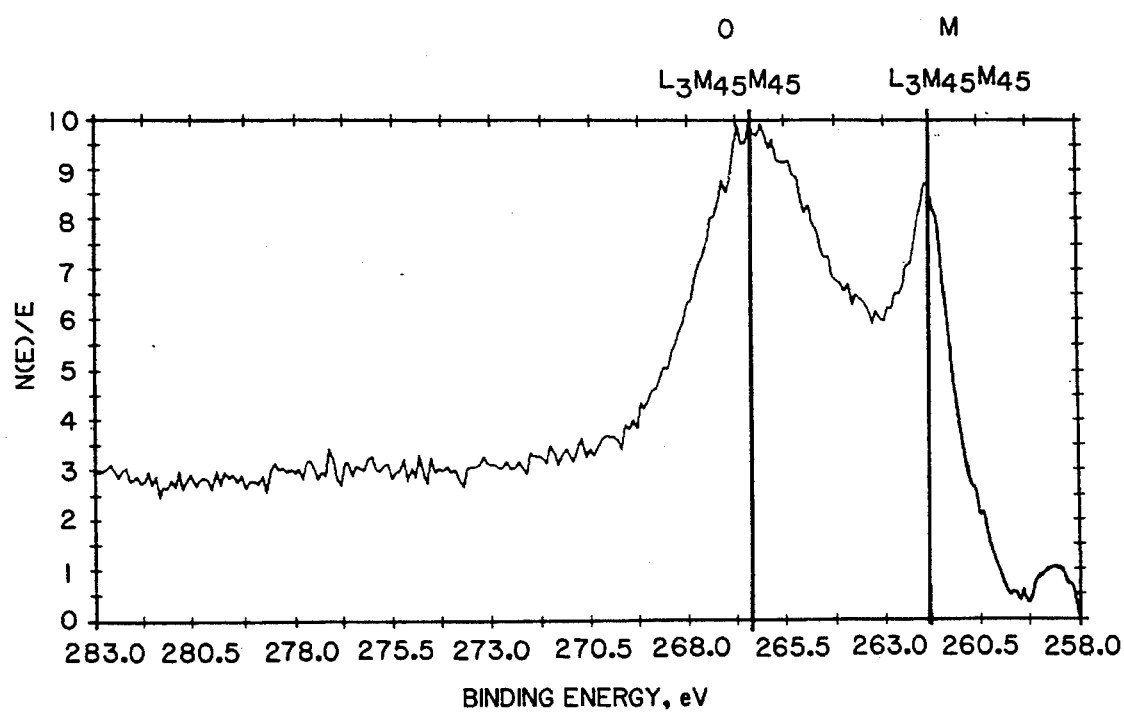
Figure 11:
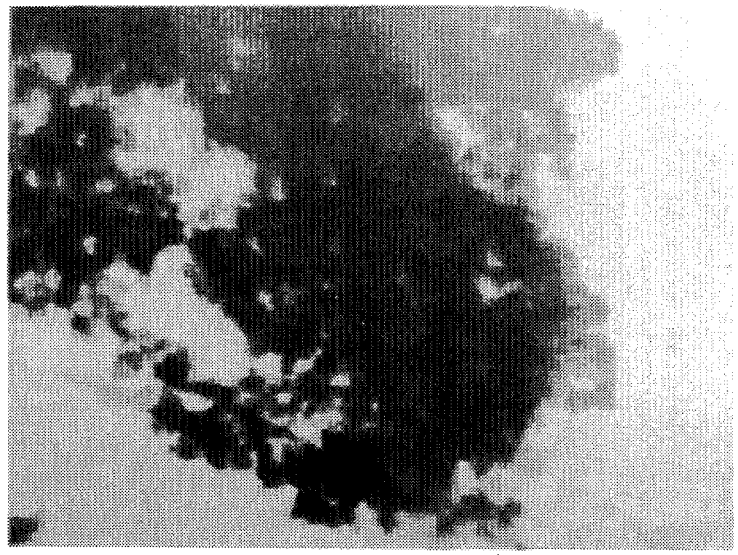
FIG. 11 is an electron micrograph of Zn aggregation at a magnification of 100,000 (1000 Angstroms per cm).
Figure 12:
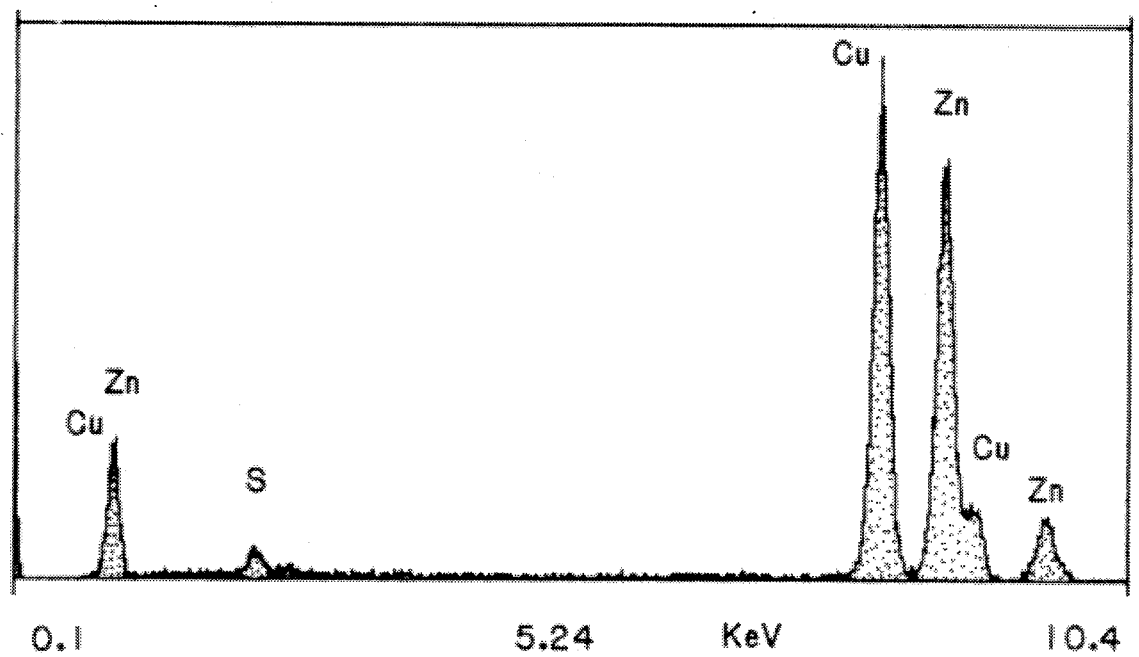
FIG. 12 is a graph showing an energy dispersive spectrum (EDS) of Zn/ZnO particles.

ZnI$_2$ was reduced by $K^+$ (15C5)$_2$K$^-$ (with possibly some $K^+$ (15C5)$_2$e$^-$) in dimethyl ether. Neither metallic zinc nor the zinc oxide peak was detected by XRD studies of the washed precipitate which means that the particle size of the product is so small that the powder peak cannot be observed. This corresponds to a mean particle diameter of less than 25 Å. The XPS spectra of FIG. 10 show that the L$_3$M$_{45}$M$_{45}$ AUGER peaks of both the metal and the oxide appear. (A) is the spectrum of the reaction products, while (B) and (C) are the results after 2 and 5 minutes sputtering by argon ions. As the surface oxide layer is sputtered off, the metal peak increases and the oxide peak decreases. The micrograph of FIG. 11 shows the aggregation of the zinc particles. Only zinc peaks appear in the EDS spectrum of FIG. 12 which shows that these particles are either zinc or zinc oxide (note that oxygen cannot be detected by our EDS system).

EXAMPLE 3

Molybdenum

Figure 13A:
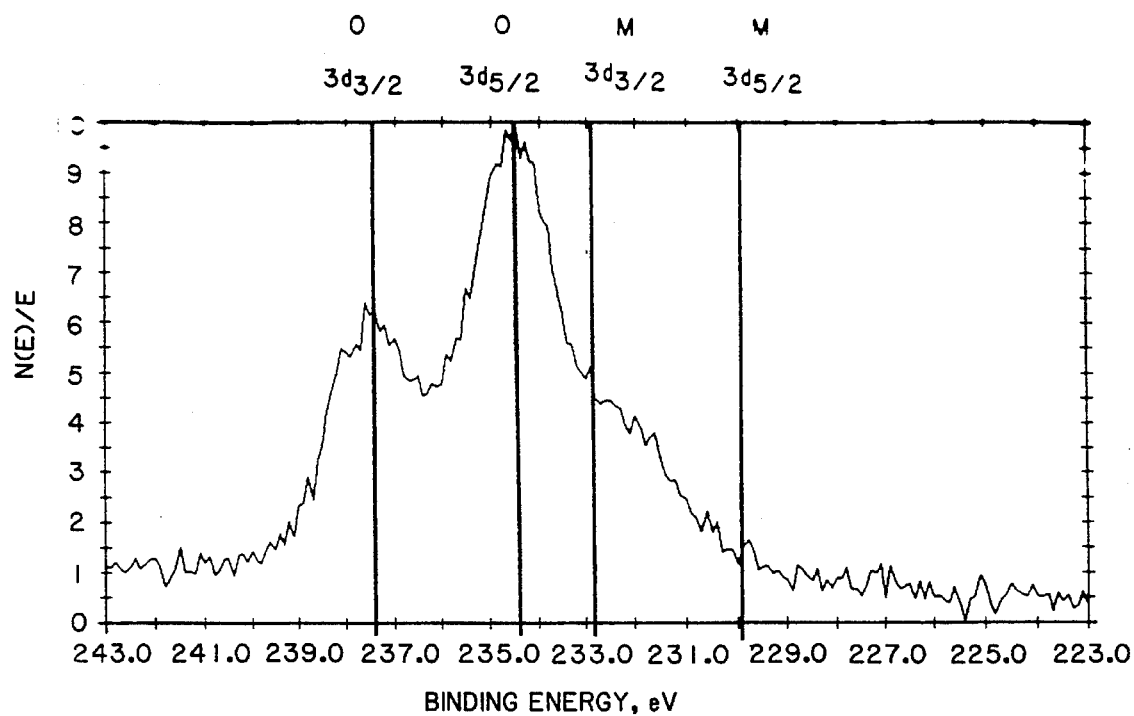
FIGS. 13A, 13B and 13C are graphs showing XPS spectra of Mo from the reduction of MoCl$_6$.
Figure 13B:
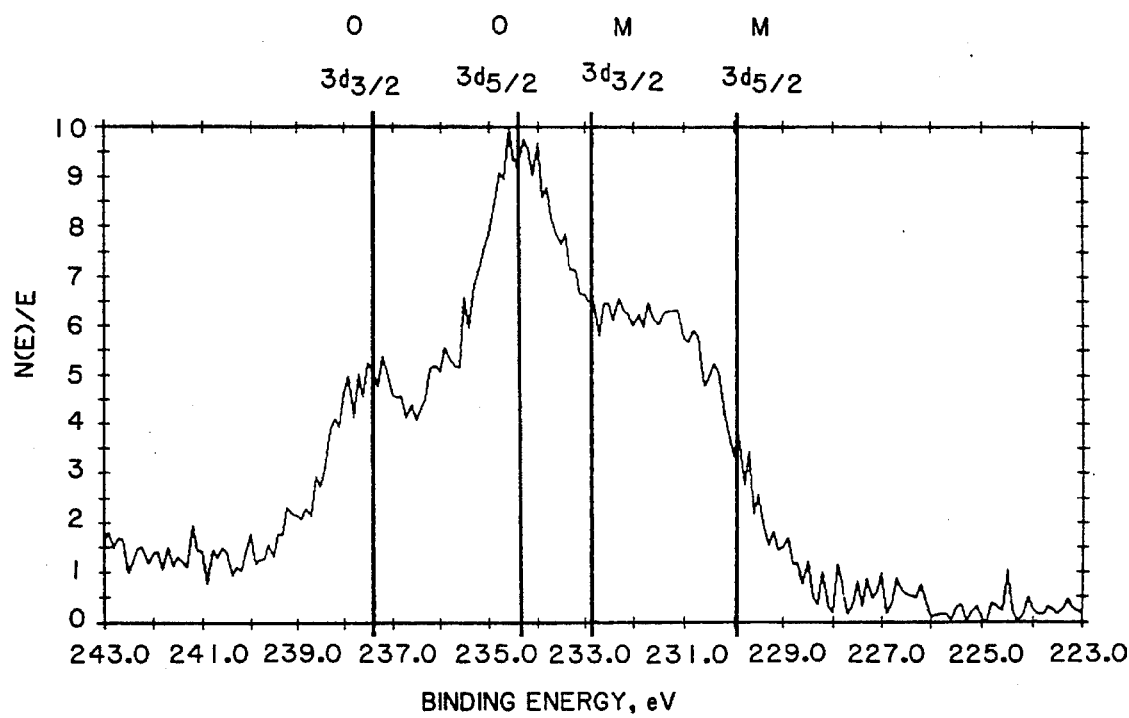
Figure 13C:
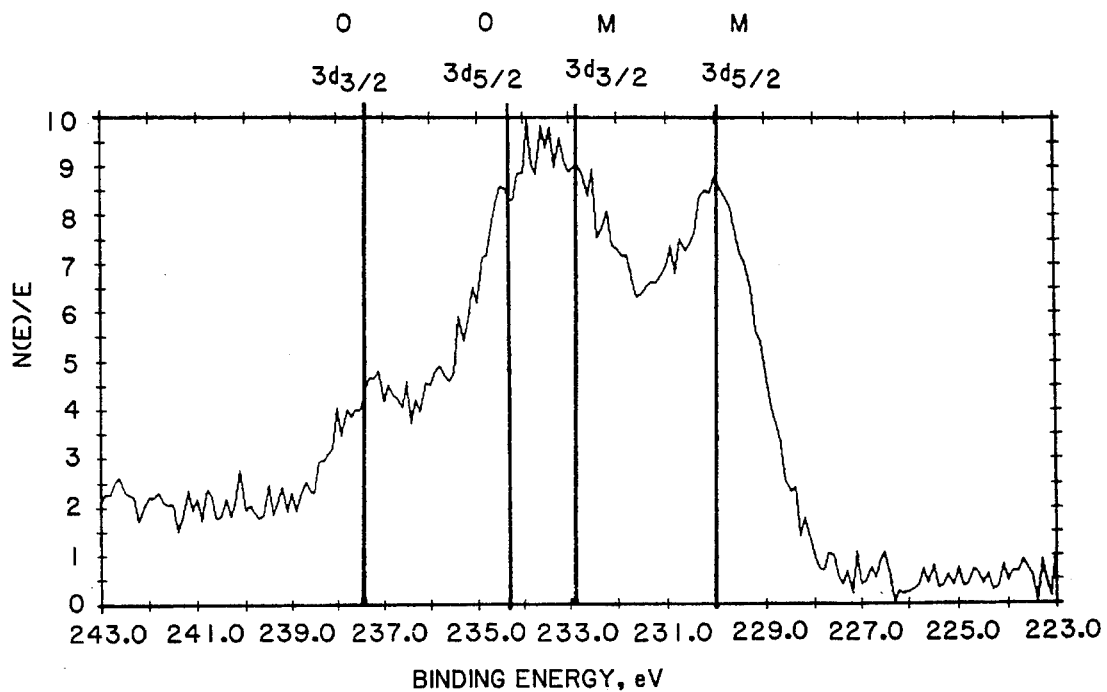

MoCl$_6$ was reduced by $K^+$ (15C5)$_2$K$^-$ in dimethyl ether. Again both metallic and oxide $3d_{5/2}$ and $3d_{3/2}$ XPS peaks appear in FIG. 13. The metal peak increases and the oxide peak decreases after 10 and 20 minutes of argon sputtering as shown in FIGS. 13 (B) and (C) respectively.

EXAMPLE 4

Gallium

Figure 14A:
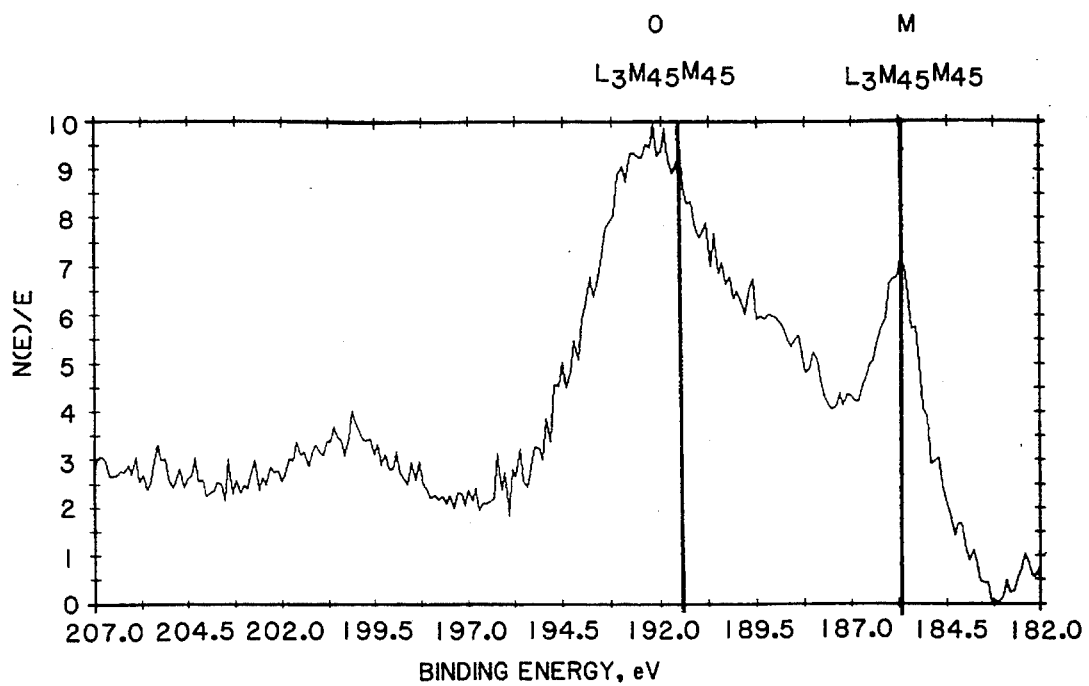
FIGS. 14A, 14B and 14C are graphs showing XPS Auger Peak spectra of Ga from the reduction of GaCl$_3$.
Figure 14B:
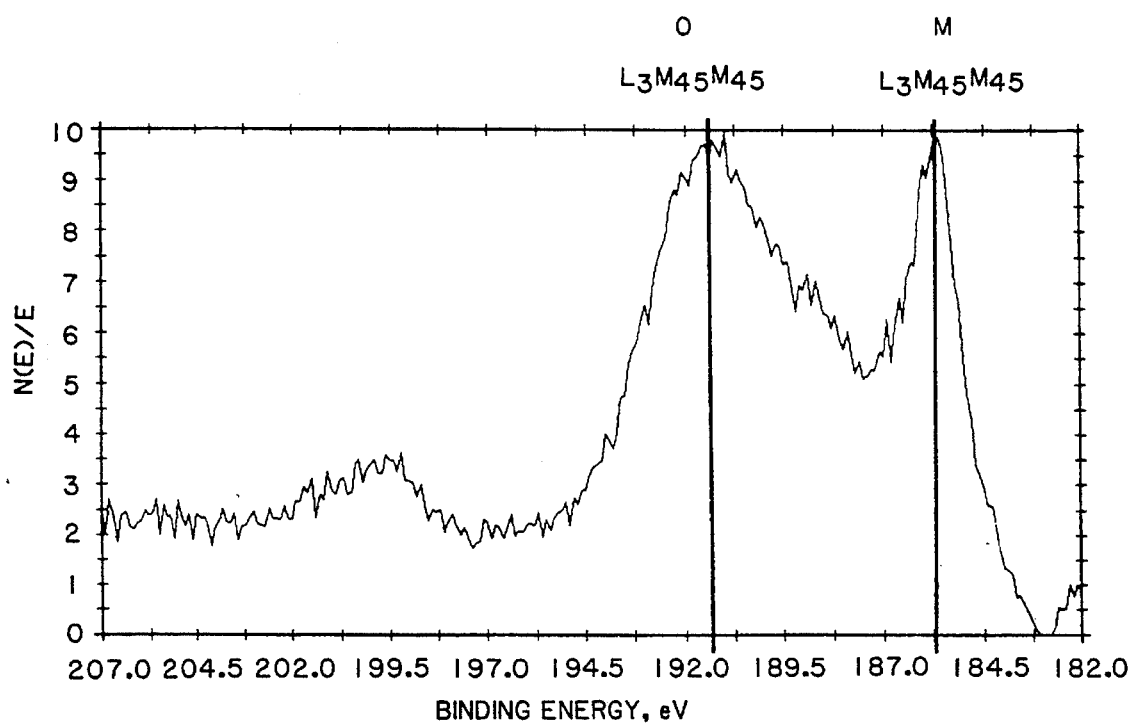
Figure 14C:
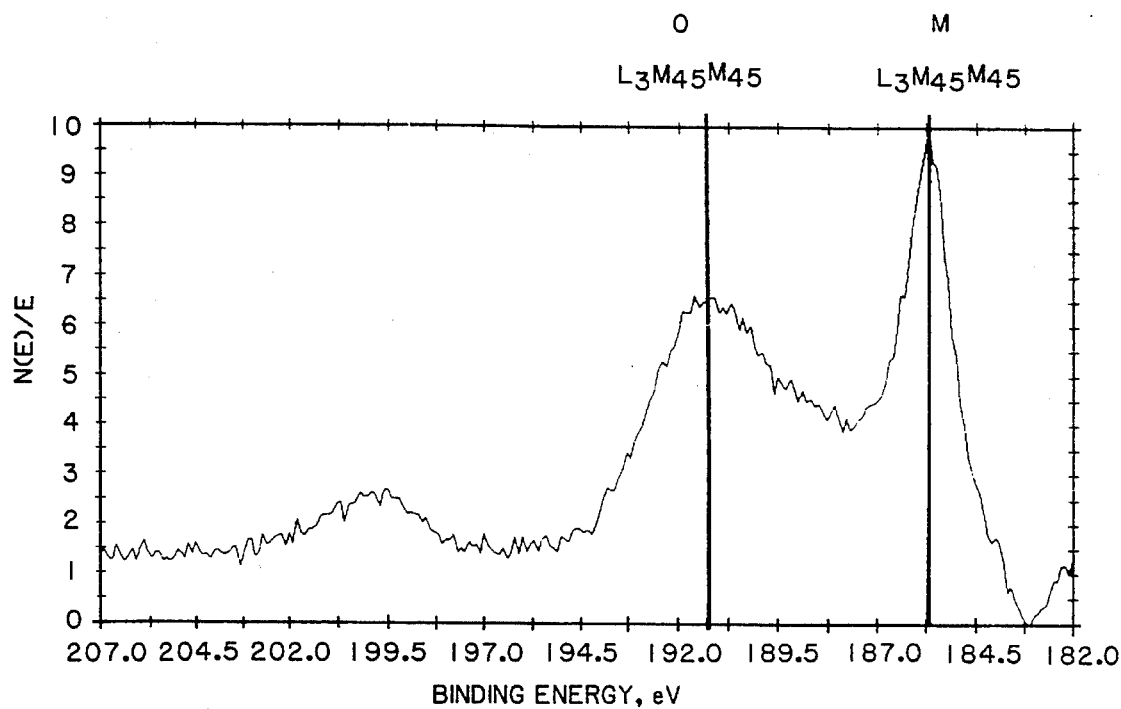

GaCl$_3$ was reduced by $K^+$ (15C5)$_2$K$^-$ in dimethyl ether. FIGS. 14 (A) and (B) show the sputtering effect on the metal and oxide L$_3$M$_{45}$M$_{45}$ Auger peaks before and after two minutes. FIG. 14B and FIG. 14C were taken at the same time after two minutes of sputtering. The relative intensity of metal to oxide in FIG. 14B and FIG. 14C is greater than that in FIG. 14A, so we know that oxide exists only on a few surface layers.

EXAMPLE 5

Tin

Figure 15A:
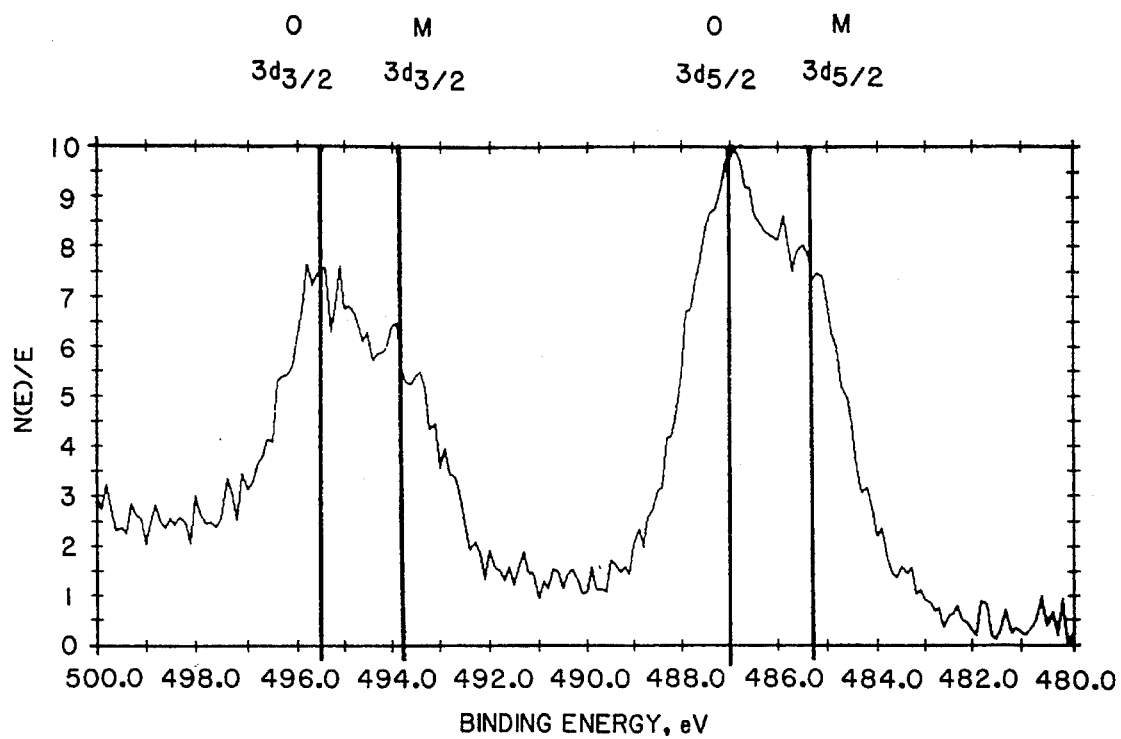
FIGS. 15A and 15B are graphs showing XPS spectra of Sn from the reduction of SnCl$_4$ before (FIG. 15A) and after exposure to air (FIG. 15B).
Figure 15B:
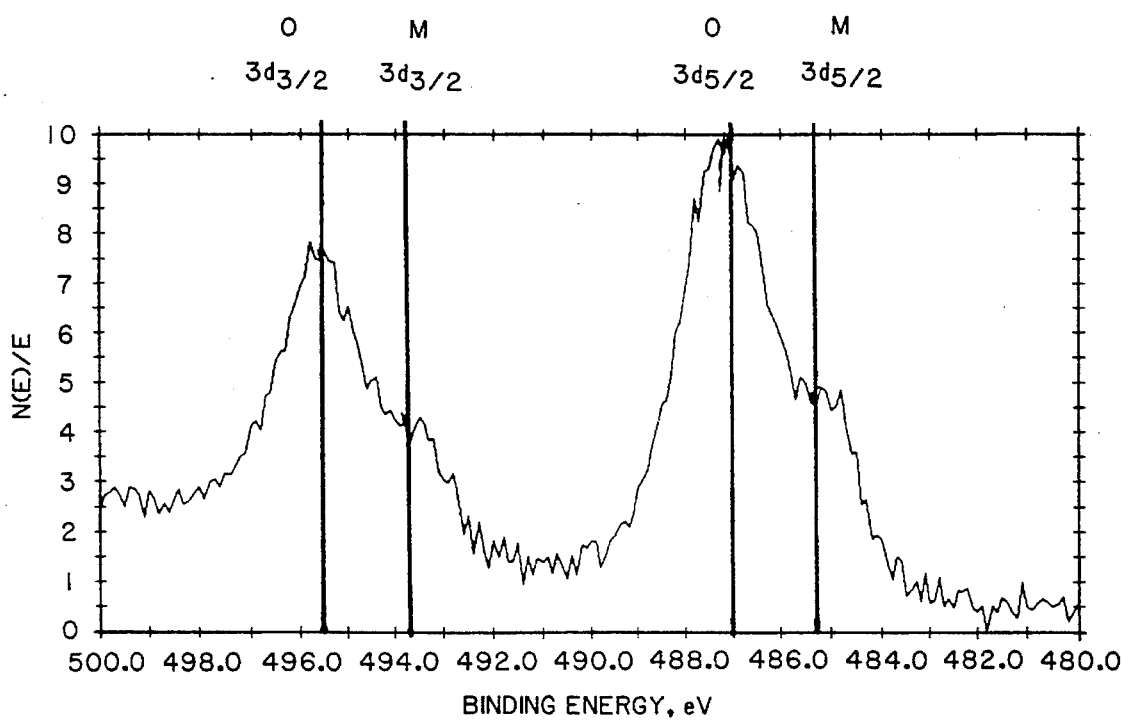

SnCl$_4$ was reduced by $K^+$ (15C5)$_2$K$^-$ in dimethyl ether. FIG. 15A shows that the $3d_{5/2}$ and $3d_{3/2}$ peaks of both the metal and the oxide are present. The metal peaks decreased dramatically as shown in FIG. 15B after the sample had been exposed for just a few seconds to the air. This shows how easily the small tin particles are oxidized.

EXAMPLE 6

Iron

Figure 16A:
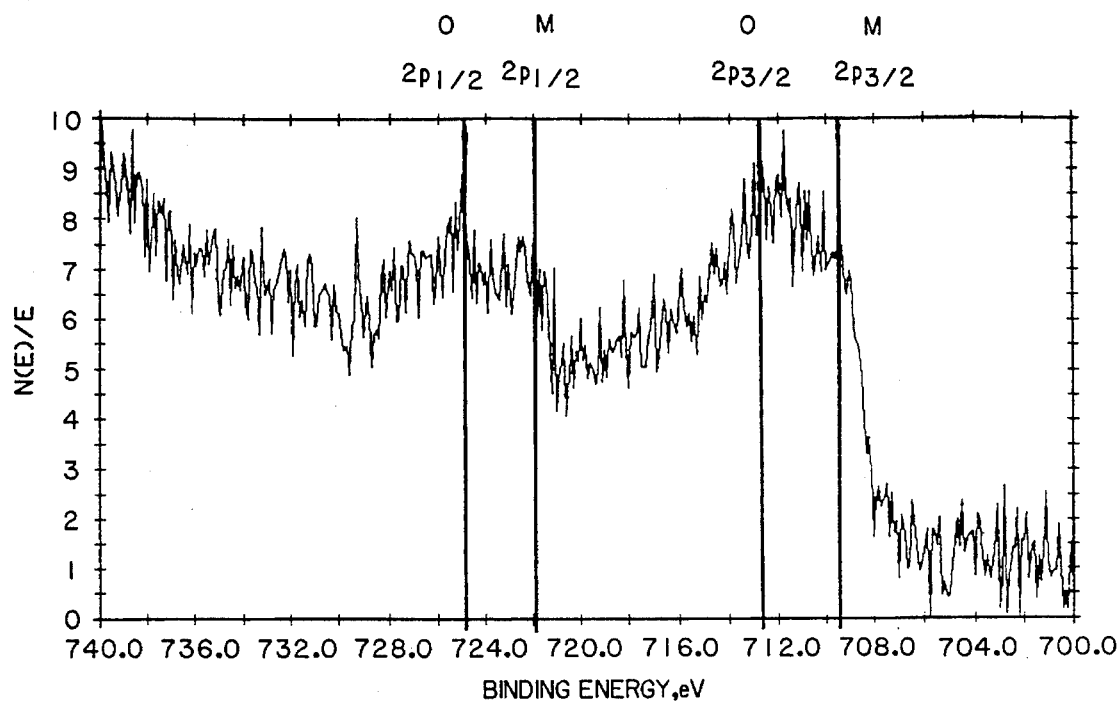
FIGS. 16A, 16B and 16C are graphs showing XPS spectra of Fe from the reduction of FeCl$_3$ before and after sputtering in an argon atmosphere.
Figure 16B:
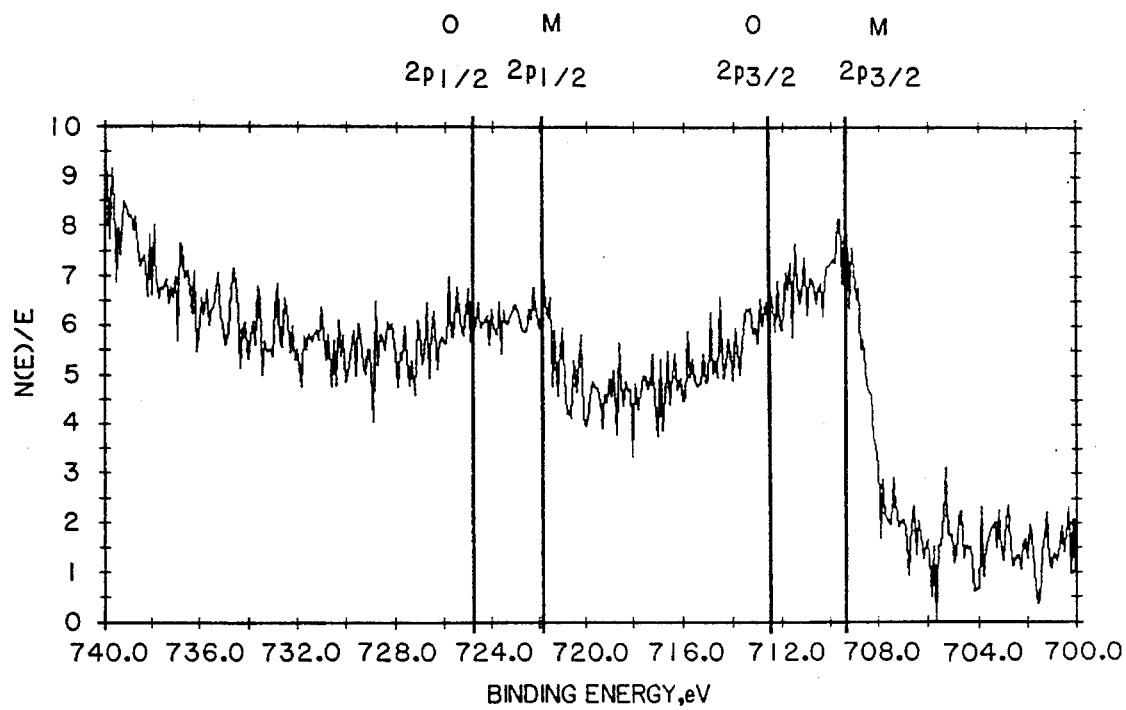
Figure 16C:
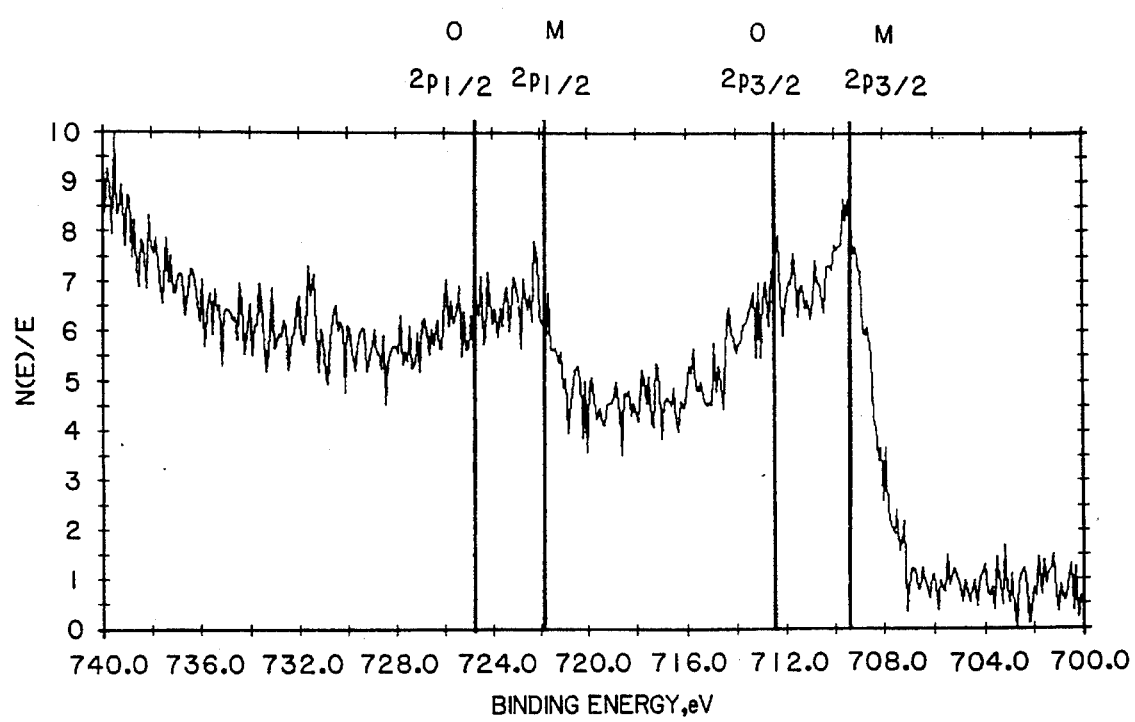

FeCl$_3$ was reduced by $K^+$ (15C5)$_2$K$^-$ in dimethyl ether. FIG. 16A shows the XPS results of the $2p_{3/2}$ and $2p_{1/2}$ peaks of both the metal and the oxide before sputtering. FIGS. 16B and FIG. 16C show the results after 5 and 15 minutes of sputtering, respectively. Again, these results indicate that metallic iron is produced by reduction but that the surface layer is oxidized.

EXAMPLE 7

Copper

Figure 17:
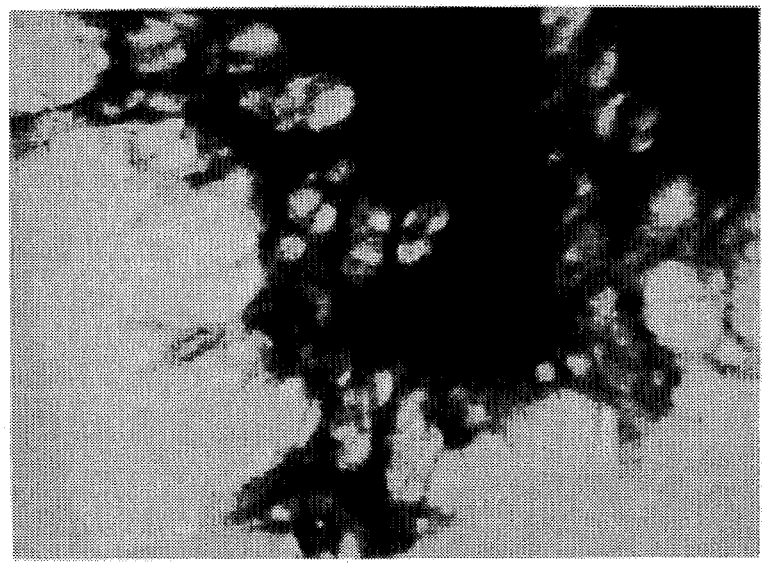
FIG. 17 is an electron micrograph of Cu and other products from the reduction of CuCl$_2$ at 100,000 times magnification (1000 Å/cm).
Figure 18:
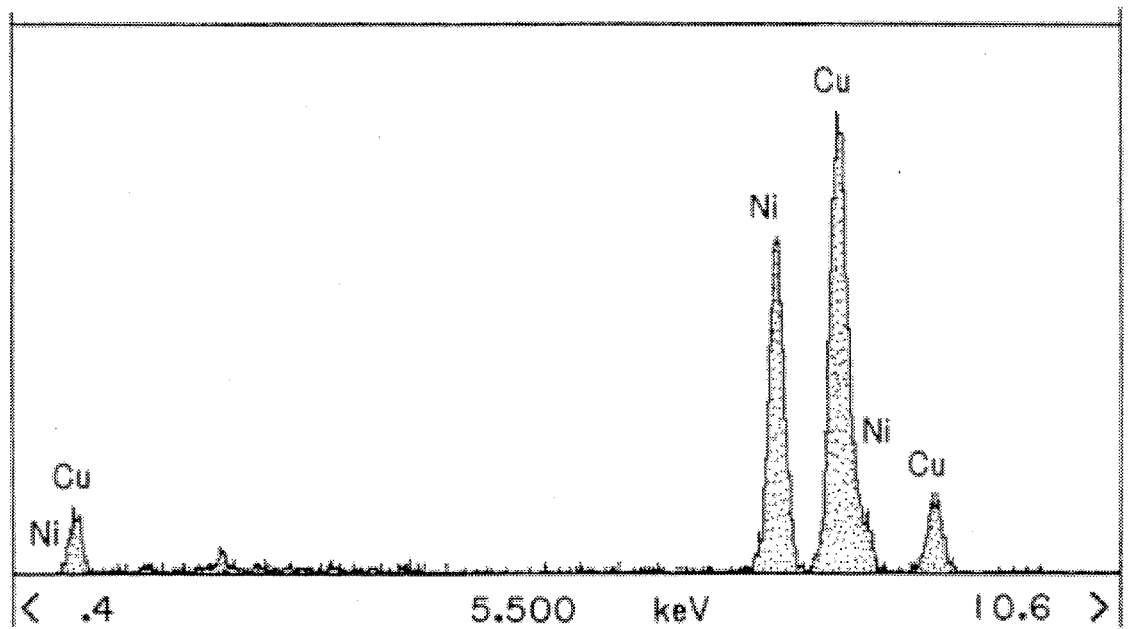
FIG. 18 is a graph showing an EDS spectrum of the reduction of CuCl$_2$.

CuCl$_2$ was reduced by K+(15C5)$_2$K$^-$ in THF. The XRD spectrum of the product was run after washing away the by-products, KCl and $K^+$ (15C5)$_2$Cl$^-$, and again no peak was observed in the XRD, which indicates that either the particle size was very small or the intensity was too low to observe. The micrograph shown in FIG. 17 displays the aggregation of the product. The EDS spectrum of FIG. 18 for these particles shows only copper peaks and background peaks from the nickel grid.

EXAMPLE 8

Titanium

Figure 19:
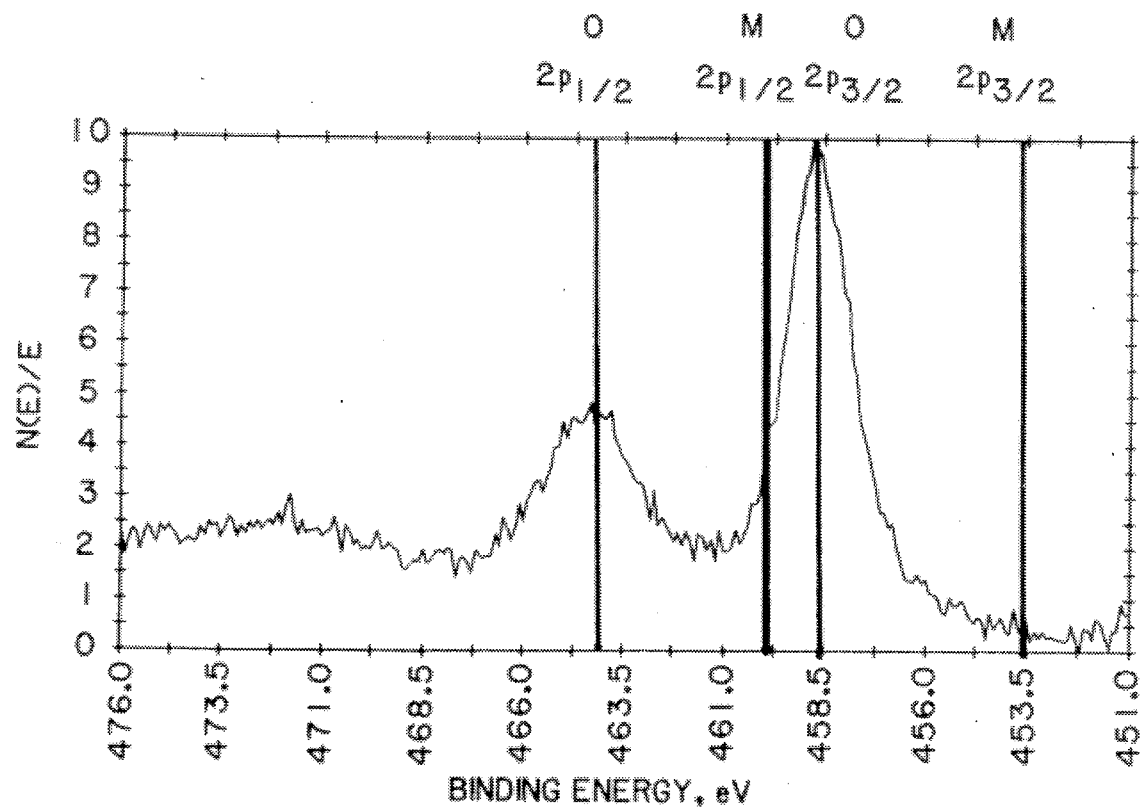
FIG. 19 is a graph showing an XPS spectrum of the reduction of TiCl$_4$. Note that only oxidized titanium is present.
Figure 20:
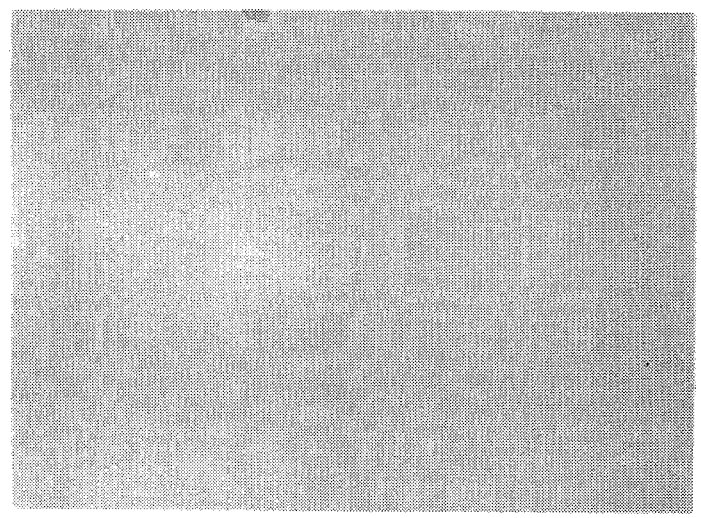
FIG. 20 is an electron micrograph of TiO$_2$ produced by the process from TiCl$_4$ at 100,000 times magnification (1000 Å/cm).

TiCl$_4$ was reduced by $K^+$ (15C5)$_2$K$^-$ in dimethyl ether. Only the $2p_{3/2}$ and $2p_{1/2}$ titanium oxide peaks were observed in the XPS spectrum shown in FIG. 19. The particle size from the micrograph of FIG. 20 (at 400Å/cm) is estimated to be about 20 to 40 Å. Again EDS spectroscopy detected only titanium peaks.

EXAMPLE 9

Silicon, Aluminum, Vanadium and Tungsten

SiCl$_4$, AlCl$_3$, VCl$_3$ and WCl$_6$ were also reduced by $K^+$ (15C5)$_2$K$^-$ in dimethyl ether. The blue color of the alkalide disappeared in all cases and precipitates formed but the products have not yet been characterized. The products are believed to be metals and/or oxides.

EXAMPLE 10

Copper Using a Different Alkalide

Figure 21:
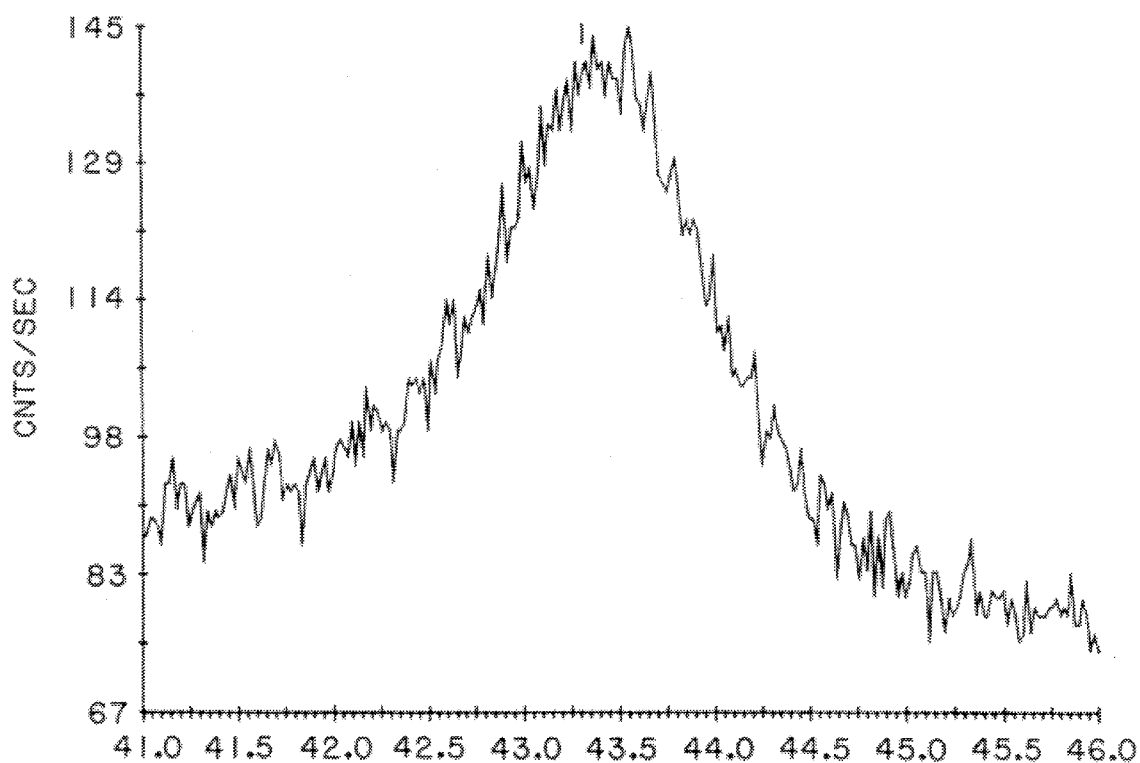
FIG. 21 is a graph showing an XRD pattern of Cu from the reduction of CuCl$_2$ washed with methanol.

Copper Chloride, $CuCl_2$, was reduced by the alkalide, $Rb^+$ $(15C5)_2Rb^-$, to produce small metallic copper particles. These were fully characterized by x-ray powder diffraction (XRD), electron diffraction (ED), and x-ray photoelectron spectroscopy (-XPS). Only metallic copper peaks were detected by XRD from the precipitates after washing away the by-products, $Rb(15C5)_2Cl$ and $RbCl$. The mean particle size of the strongest peak of $Cu(111)$ from the XRD line broadening, as shown in FIG. 21, is about 57 Å after washing by methanol.

Figure 22:
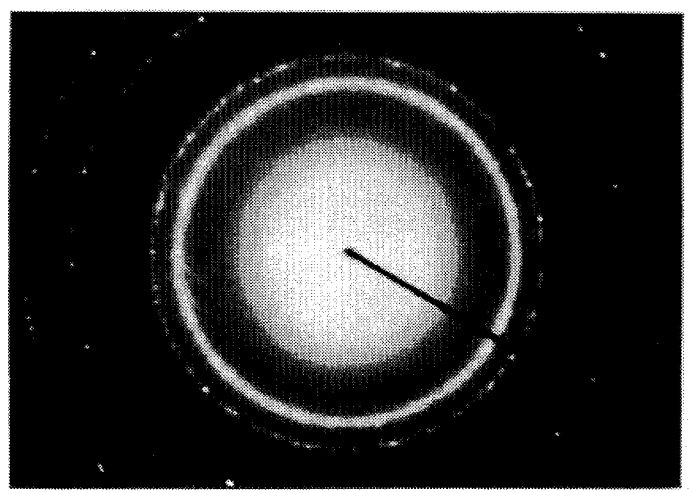
FIG. 22 is a photograph showing an electron diffraction pattern of Cu.
Figure 23:
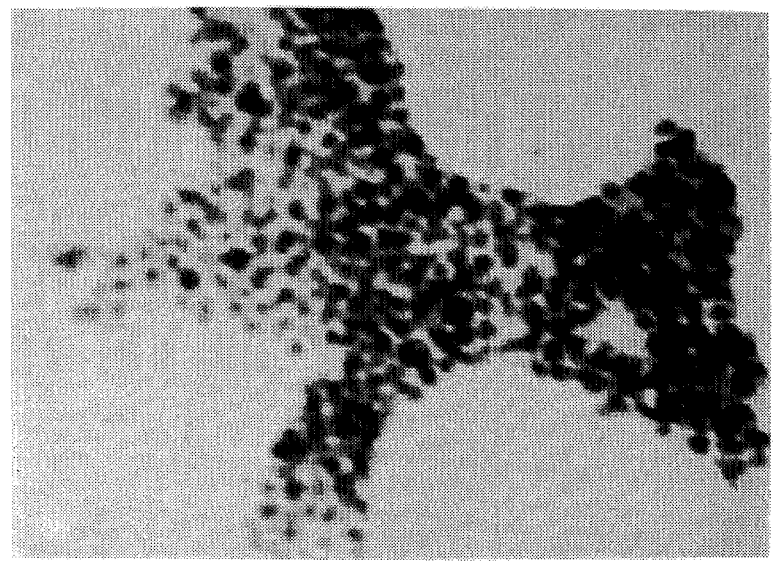
FIG. 23 is an electron micrograph of Cu particles at 320,000 times (310 angstroms per cm).
Figure 24:
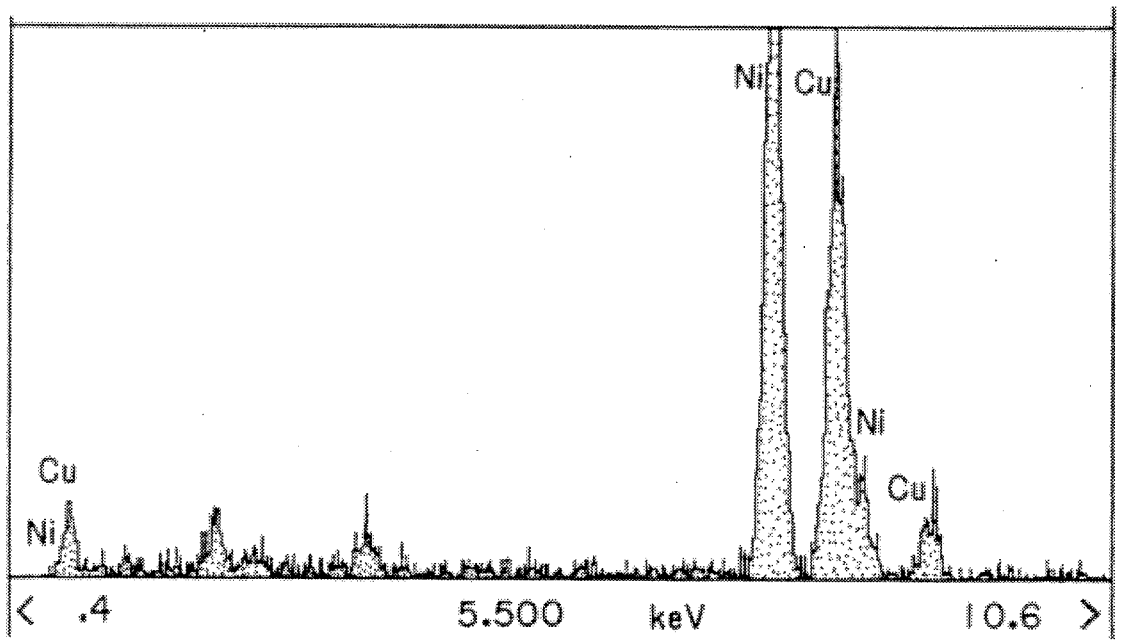
FIG. 24 is a graph showing an EDS spectrum of Cu particles on a nickel grid.

FIG. 22 shows the unique electron diffraction pattern of metallic copper lines (111), (200), (220), (311) from inner to outside rings. The micrograph of FIG. 23 with a magnification of 320,000 agrees well with the particle size of 57 Å from the XRD line broadening of metallic Cu product in the same run. These particles were also characterized by energy dispersive spectroscopy as shown in FIG. 24. Only Cu peaks appear on Ni grid.

Figure 25A:
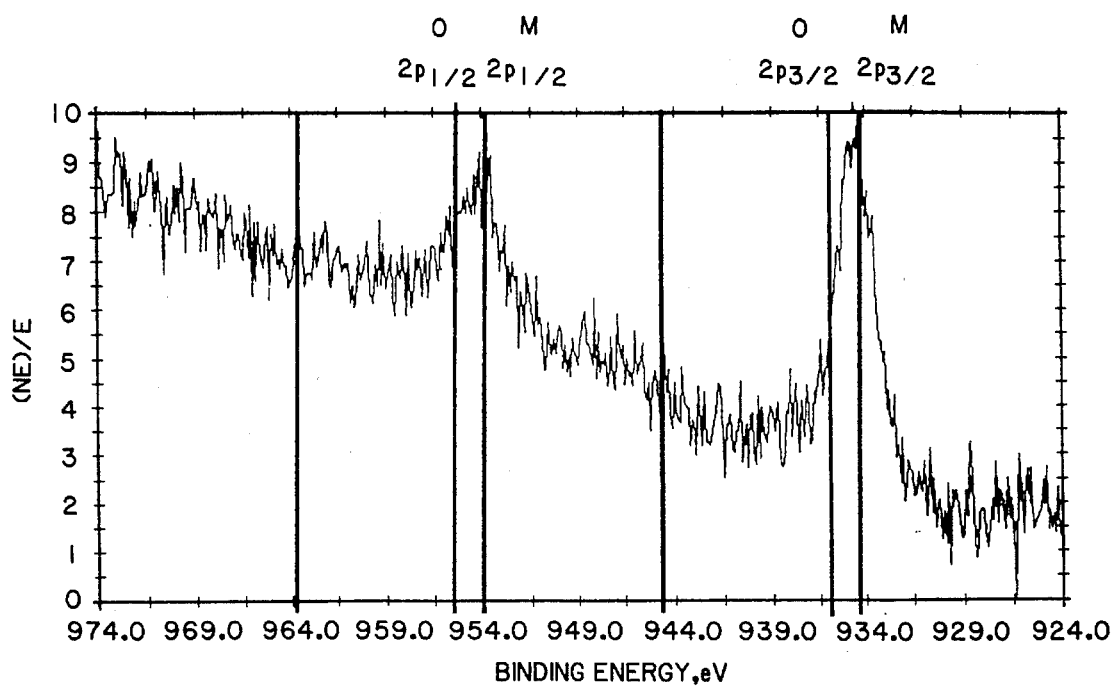
FIGS. 25A, 25B and 25C are graphs showing XPS spectra of Cu particles before washing (FIG. 25A) and the presence of CuO after oxidation in air (FIGS. 25B) and after washing with methanol (FIG. 25C).
Figure 25B:
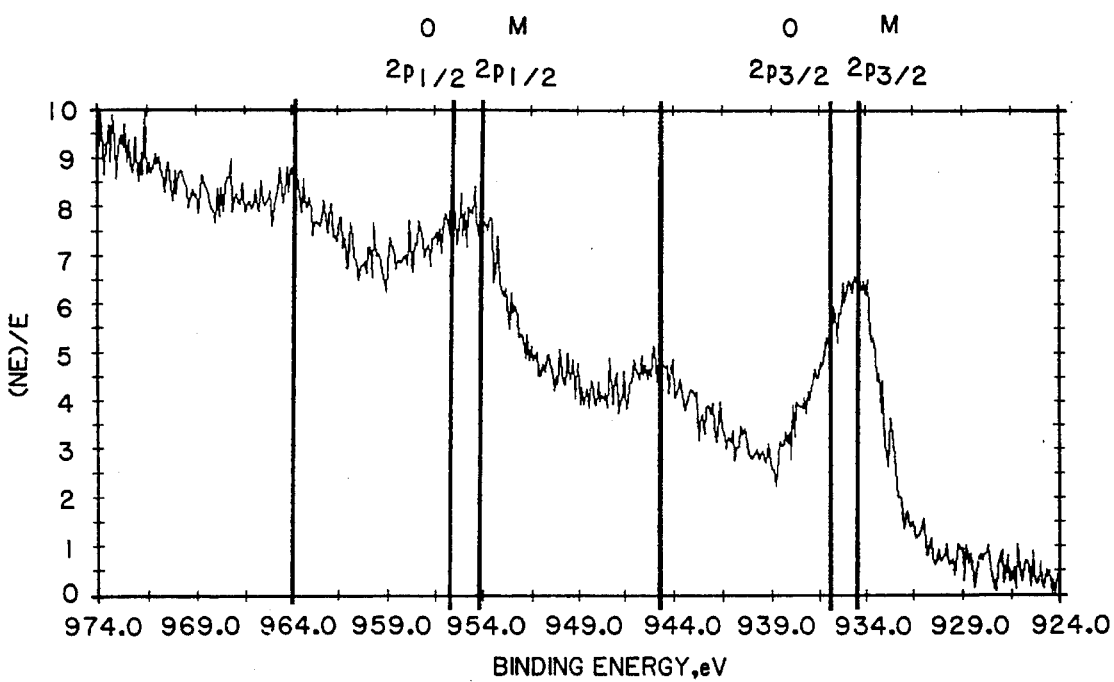
Figure 25C:
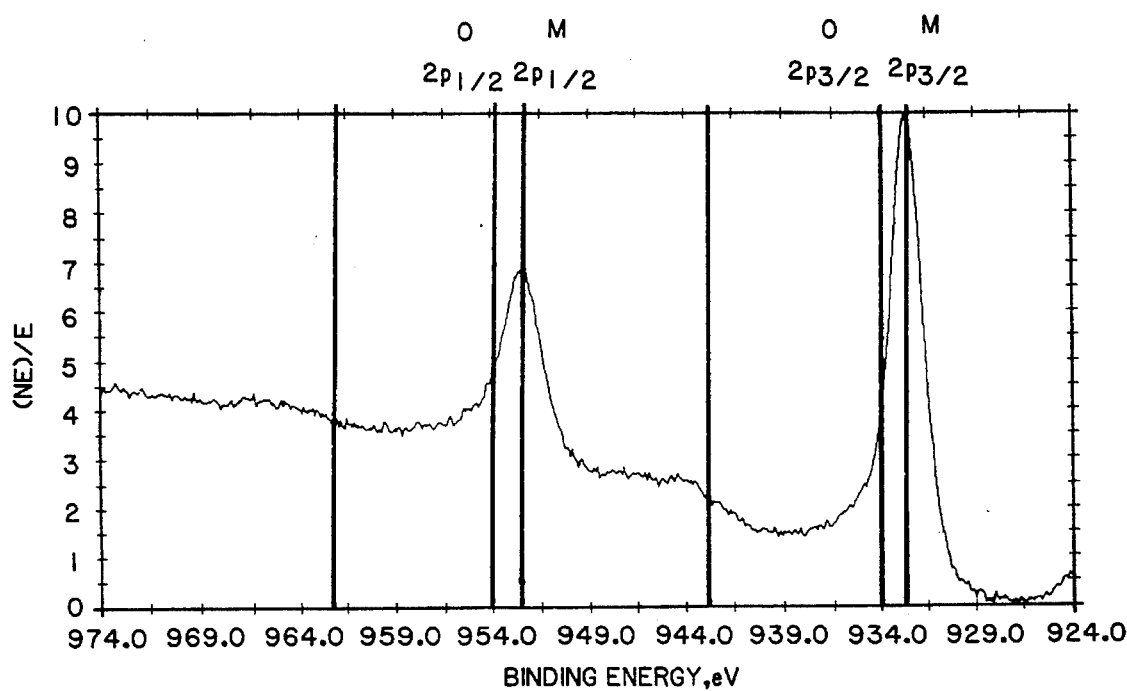

The small Cu particles were also characterized by XPS and only the peaks of $2p_{3/2}$ at 932.6 eV and $2p_{1/2}$ at 952.4 eV appear on FIG. 25A before washing and FIG. 25C after washing away by-products by methanol. FIG. 25B shows that a small amount of CuO is present on the Cu surface after standing in air for 24 hours.

EXAMPLE 11

Figure 26A:
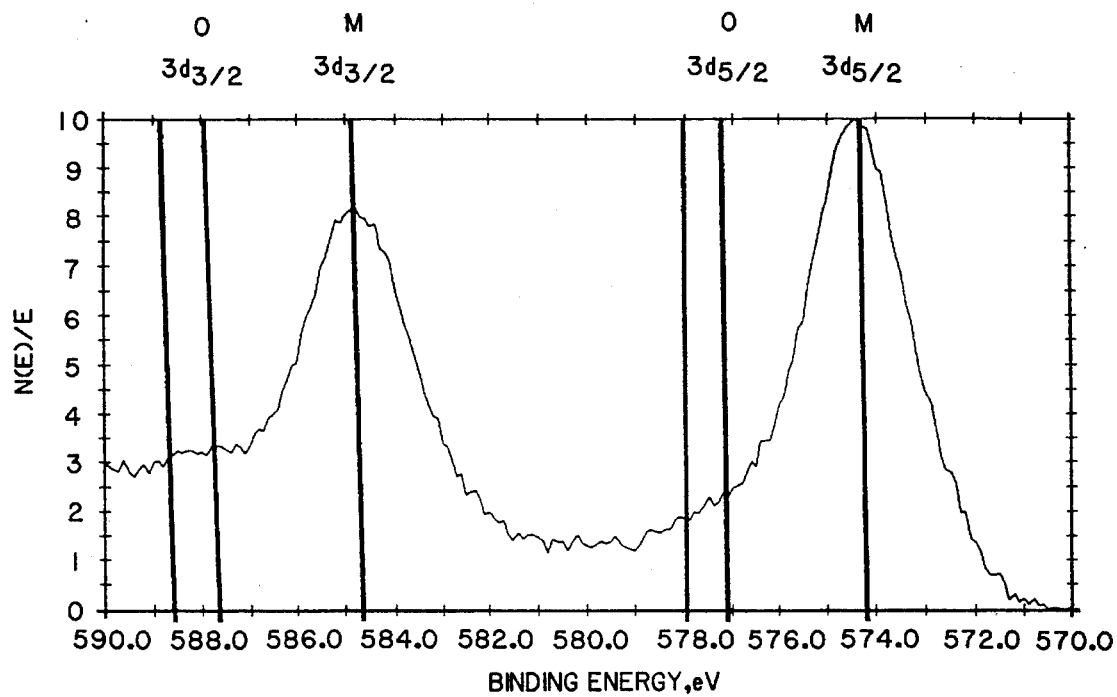
FIGS. 26A, 26B and 26C are graphs showing the XPS spectra of the product of reduction of TeBr$_4$ before washing (FIG. 26A), after air oxidation (FIG. 26B) and after a methanol wash (FIG. 26C).
Figure 26B:
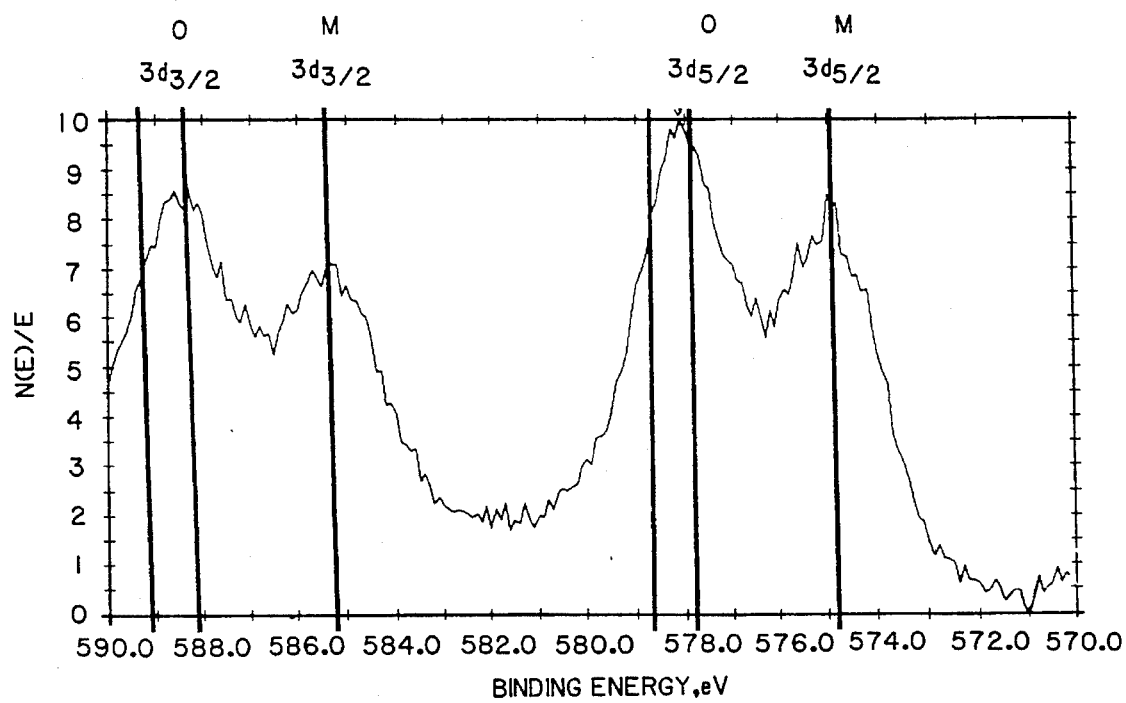
Figure 26C:
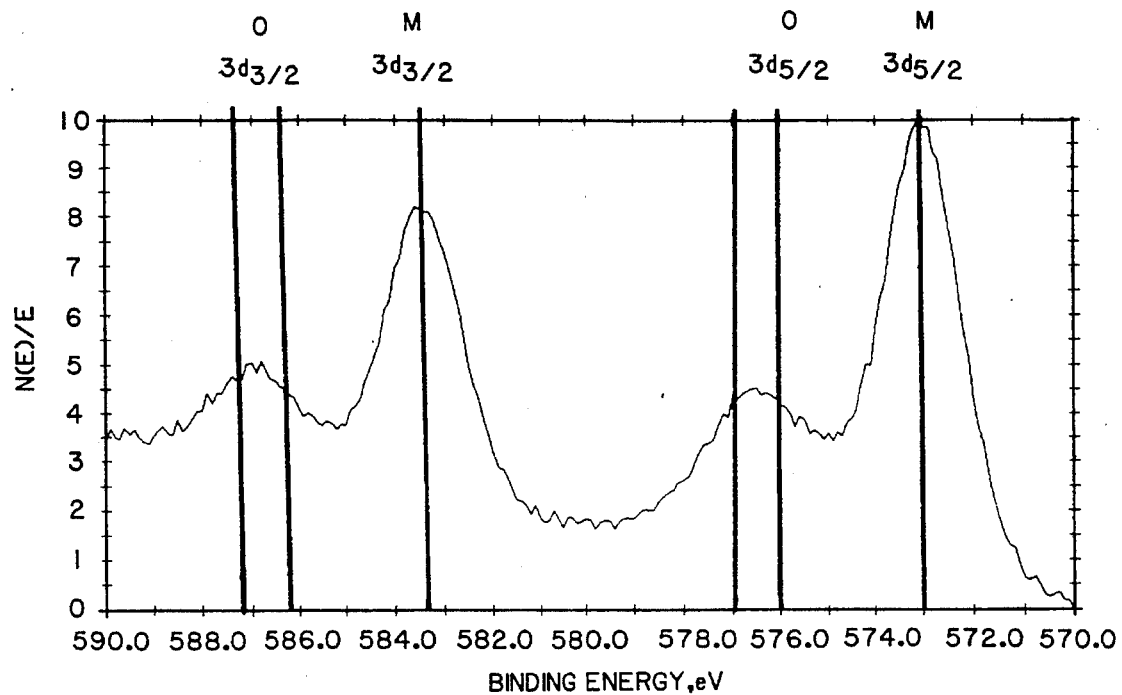

Tellurium $TeBr_4$ was reduced by $K^+$ $(15C5)_2e^-$ in dimethyl ether. FIG. 26A shows the XPS results of the $3d_{5/2}$ and $3d_{3/2}$ peaks of metallic Te before washing. After oxidizing these products in the air 3 minutes, the oxide peaks are larger than metal peaks as shown in FIG. 26B. These particles were partially oxidized after washing by methanol as shown in FIG. 26C. Clean metallic Te peaks were observed in another methanol washed product. Electron diffraction studies showed that the particles were elemental tellurium.

EXAMPLE 12

Nickel

By adding triethyl phosphine to increase the solubility, $NiBr_2$ was reduced by $K^+$ $(15C5)_2K^-$ in dimethyl ether. The products were kept in an H-cell under vacuum 4 days and analyzed by XPS. FIG. 27A shows metallic Ni peaks only. Small amount of NiO peaks appear when these particles were oxidized in the air 24 hours, but all Ni particles were oxidized after washing by methanol as shown in FIGS. 27B and 27C.

EXAMPLE 13

Antimony $SbCl_5$ was reduced by $K^+$ $(15C5)_2K^-$ in dimethyl ether. Both metallic and oxide $3d_{5/2}$ and $3d_{3/2}$ XPS peaks appear in FIGS. 28A and 28B before and after washing with methanol. The washed products were sputtered by 14 mpA Ar ion 20 minutes. The result in FIG. 28C shows that only a small amount of oxide is left after sputtering.

EXAMPLE 14

Reducing Agents

Six (6) alkalides and 1 electride were used as reducing agents including: $K^+(18C6)Na^-$, $Cs^+(18C6)_2Na^-$, $Cs^+(15C5)_2Na^-$, $Rb^+(15C5)_2Na^-$, $K^+(15C5)_2K^-$, $Rb^+(15C5)_2Rb^-$ and $K^+(15C5)_2e^-$. There was no difference in the reducing ability between them as the blue colors of alkalide or electride disappeared immediately upon reaction.

As can be seen from the foregoing examples, four elements have been produced by alkalide or electride without oxide on the metal surface including: Au, Te, Cu and Ni. Six elements, Fe, Zn, Ga, Mo, Sn and Sb, have oxides on their surfaces by XPS. $AlCl_3$, $SiCl_4$, $VCl_3$, $GeCl_4$ and $WCl_6$ can react with alkalide or electride but the precipitates have not yet been characterized. Oxidized titanium ($TiO_2$ or other product) which has been characterized by XPS is the only product from the reduction of $TiCl_4$ by this method.

FIGS. 29 to 42 show various metals, compounds and compositions which are produced by the method of the present invention.

The following represent some possible applications for the finely divided metals, metals with oxide coatings and metal oxides:

1) Precipitation of a single metal or several metals on a support for catalytic purposes. Noble metal particles can be deposited on an oxide support such as $Al_2O_3$. Perhaps most important here would be those applications that require intimate mixtures of two or more metals on such a support. More reactive metals and alloys can also be prepared on such supports but there would be surface or complete oxidation. Of course, there is no reason that the support could not have other forms, such as sintered metal oxides, "honeycomb" structures, and the like.

2) Preparation of extremely high surface area metal on metal oxide catalysts by co-precipitation of a noble metal and an active metal. For example, Pt and Ti could be co-precipitated to obtain Pt metal in high concentrations on extremely small $TiO_2$ particles. The number of possible combinations is enormous and include alkoxide supports (with an alcohol wash) or other supports, depending on workup conditions.

3) Ceramic precursors can be prepared by appropriate mixtures of active metals which could be fired to a final ceramic.

4) Difficult-to-produce new alloys can be prepared by coprecipitation of two or more metals. The advantage of low temperature processing is possible.

5) Colloidal metal solutions should be readily produced by the process of the present invention if one takes steps to prevent aggregation such as by adding dispersants.

6) Small semiconductor particles such as GaAs can be produced by reducing a mixture of Ga and As compounds. A solid-state reaction in such small particles could occur to yield the stable III-V compound. The main advantages of the process of the present invention are its wide applicability to many different compounds, the fact that reduction occurs rapidly from a homogeneous solution, and the low temperatures at which metallic particles can be produced. The process of the present invention points the way to entirely new families of catalysts and alloys which cannot be prepared in any other way.

It is intended that the foregoing description be only illustrative of the present invention and that the present invention be limited only by the hereinafter appended claims.

We claim:

1. A catalyst which comprises:

(a) finely divided gold with a particle size between about 20 and 500 Angstroms produced by reducing a gold salt with a reducing agent selected from the group consisting of an electride and an alkalide having a formula selected from the group consisting of $M^+$ (Complexant)$N^-$ and $M^+$ (Complexant)$_m e^-$ wherein $M^+$ and $N^-$ are selected from the group consisting of sodium, potassium, cesium, rubidium and lithium in an organic solvent and under a nonoxidizing atmosphere to produce the gold; and (b) an alumina support having the gold deposited thereon wherein the support with the gold can be used as the catalyst.

2. The method of claim 1 wherein the alkalide is $K^+$ (15C5)$_2 K^-$.

3. The method of claim 1 wherein the alkalide is $Rb^+$ (15C5)$_2 Rb^-$.

4. A catalyst which comprises:

(a) finely divided platinum with a particle size between about 20 and 500 Angstroms produced by reducing a platinum salt with a reducing agent selected from the group consisting of an electride and an alkalide having a formula selected from the group consisting of $M^+$ (Complexant)$N^-$ and $M^+$ (Complexant)$_m e^-$ wherein $M^+$ and $N^-$ are selected from the group consisting of sodium, potassium, cesium, rubidium and lithium in an organic solvent and under a non-oxidizing atmosphere to produce the platinum; and (b) a titanium dioxide support having the platinum deposited thereon wherein the support with the platinum can be used as the catalyst.

5. The catalyst of claim 4 wherein the alkalide is $K^+$ (15C5)$_2 K^-$.

6. The catalyst of claim 4 wherein the alkalide is $Rb^+$ (15C5)$_2 Rb^-$.

* * * * *